United States Patent
Ito et al.

(10) Patent No.: US 11,987,177 B2
(45) Date of Patent: May 21, 2024

(54) TRAVEL CONTROLLER, METHOD FOR CONTROLLING TRAVELING, AND COMPUTER READABLE STORAGE MEDIUM STORING TRAVEL CONTROL PROGRAM

(71) Applicant: J-QUAD DYNAMICS INC., Tokyo (JP)

(72) Inventors: Akira Ito, Tokyo (JP); Daisuke Tokumochi, Tokyo (JP)

(73) Assignee: J-QuAD DYNAMICS INC., Tokyo (JP)

( * ) Notice: Subject to any disclaimer, the term of this patent is extended or adjusted under 35 U.S.C. 154(b) by 205 days.

(21) Appl. No.: 17/512,497

(22) Filed: Oct. 27, 2021

(65) Prior Publication Data

US 2022/0135079 A1 May 5, 2022

(30) Foreign Application Priority Data

Oct. 30, 2020 (JP) .................................. 2020-182408
Apr. 26, 2021 (JP) .................................. 2021-074034

(51) Int. Cl.
*B60Q 1/50* (2006.01)
*B60W 40/08* (2012.01)
(Continued)

(52) U.S. Cl.
CPC ........... *B60Q 1/507* (2022.05); *B60Q 1/5037* (2022.05); *B60Q 1/543* (2022.05); *B60Q 1/547* (2022.05);
(Continued)

(58) Field of Classification Search
CPC ...... B60Q 1/507; B60Q 1/5037; B60Q 1/543; B60Q 1/547; B60W 40/08; B60W 50/10;
(Continued)

(56) References Cited

U.S. PATENT DOCUMENTS 10,134,280 B1 * 11/2018 You ........................ B60Q 1/525
2008/0185207 A1    8/2008 Kondoh
(Continued)

FOREIGN PATENT DOCUMENTS

JP          4929777 B2     5/2012

*Primary Examiner* — Isaac G Smith
*Assistant Examiner* — Nikki Marie M Molina
(74) *Attorney, Agent, or Firm* — MASCHOFF BRENNAN

(57) ABSTRACT

A travel controller recognizes an action of a driver of a vehicle from image data of the driver. The travel controller obtains information indicating that determination of whether autonomous driving of the vehicle is permissible cannot be given. When the information indicating that determination of whether the autonomous driving of the vehicle is permissible cannot be given is obtained, the travel controller operates a human interface to request the driver for an instruction to drive the vehicle. The travel controller determines whether the driver is giving an instruction to drive the vehicle from an action of the driver recognized in response to the request for an instruction to drive the vehicle. When determined in the determination process that the driver is giving an instruction to drive the vehicle, the travel controller operates a drive system of the vehicle to permit autonomous driving of the vehicle.

12 Claims, 21 Drawing Sheets

(51) Int. Cl.
*B60W 50/10* (2012.01)
*B60W 50/14* (2020.01)
*B60W 60/00* (2020.01)

(52) U.S. Cl.
CPC ............ *B60W 40/08* (2013.01); *B60W 50/14* (2013.01); *B60W 60/0018* (2020.02); *B60W 60/0051* (2020.02); *B60W 60/0059* (2020.02); B60W 2050/146 (2013.01); B60W 2540/225 (2020.02); B60W 2554/4029 (2020.02)

(58) Field of Classification Search
CPC ............ B60W 50/14; B60W 60/0018; B60W 60/0051; B60W 60/0059; B60W 2050/146; B60W 2540/225; B60W 2554/4029; B60W 2552/53; B60W 2554/20; B60W 2554/4045; B60W 30/146; B60W 30/18027; B60W 60/0015; B60W 2050/143; B60W 2540/229; B60W 2540/26; B60W 2554/4041; B60W 2720/10
See application file for complete search history.

(56) References Cited

U.S. PATENT DOCUMENTS

| | | | |
|---|---|---|---|
| 2017/0088040 A1* | 3/2017 | Williams | B60Q 1/543 |
| 2018/0004204 A1* | 1/2018 | Rider | B60K 35/00 |
| 2019/0023239 A1 | 1/2019 | Fujita et al. | |
| 2021/0182609 A1* | 6/2021 | Arar | G06F 18/214 |
| 2022/0089163 A1* | 3/2022 | Qiao | B60W 30/12 |

* cited by examiner

Fig.20A
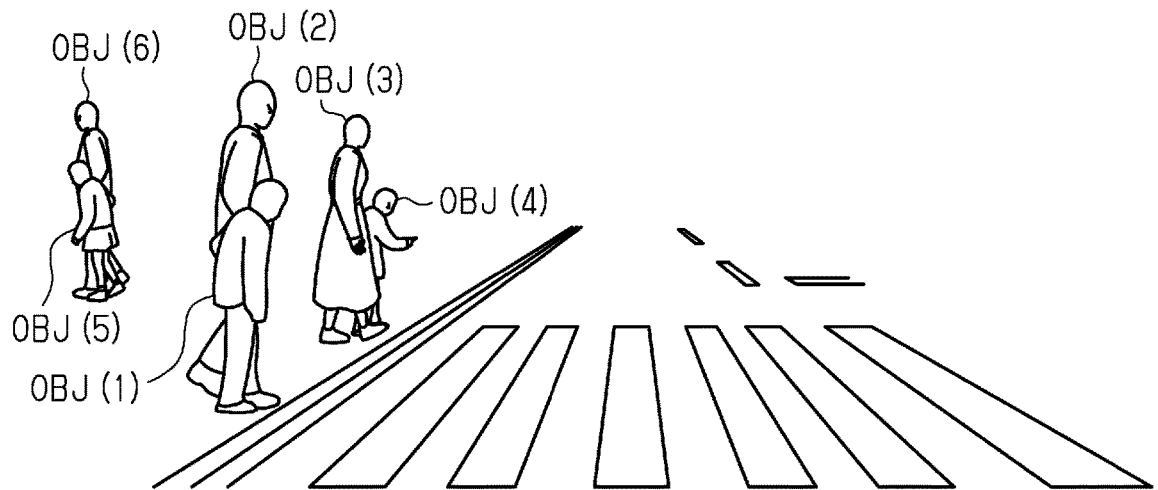
Fig.20B
| Subject Object | OBJ (1) | OBJ (2) | OBJ (3) | OBJ (4) | OBJ (5) | OBJ (6) |
|---|---|---|---|---|---|---|
| Status | Indeterminable | Indeterminable | Indeterminable | Indeterminable | Determinable | Determinable |
Fig.20C
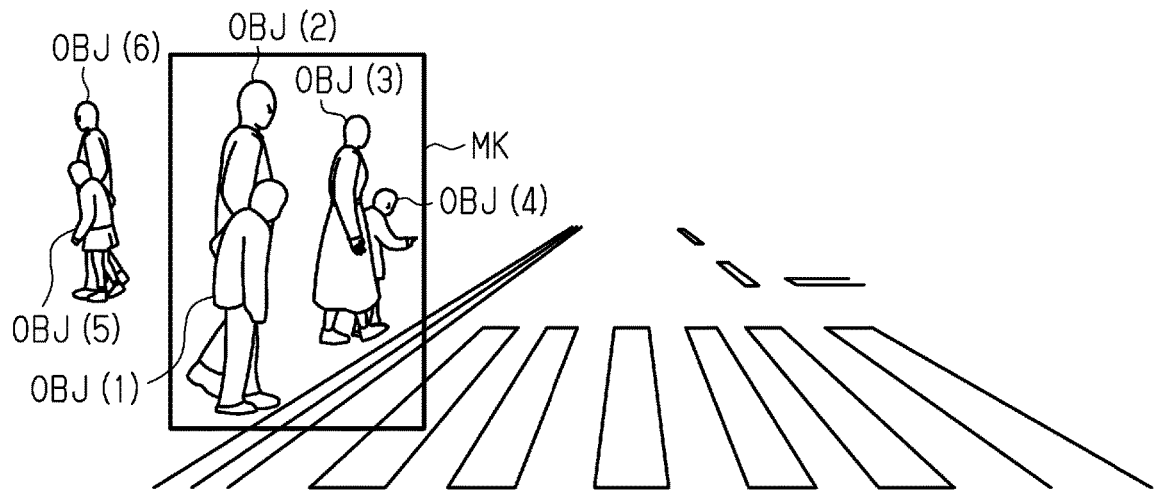
Fig.20D
| Subject Object | OBJ (1) | OBJ (2) | OBJ (3) | OBJ (4) | OBJ (5) | OBJ (6) |
|---|---|---|---|---|---|---|
| Status | Looked | Looked | Looked | Looked | Determinable | Determinable |

Fig.23A
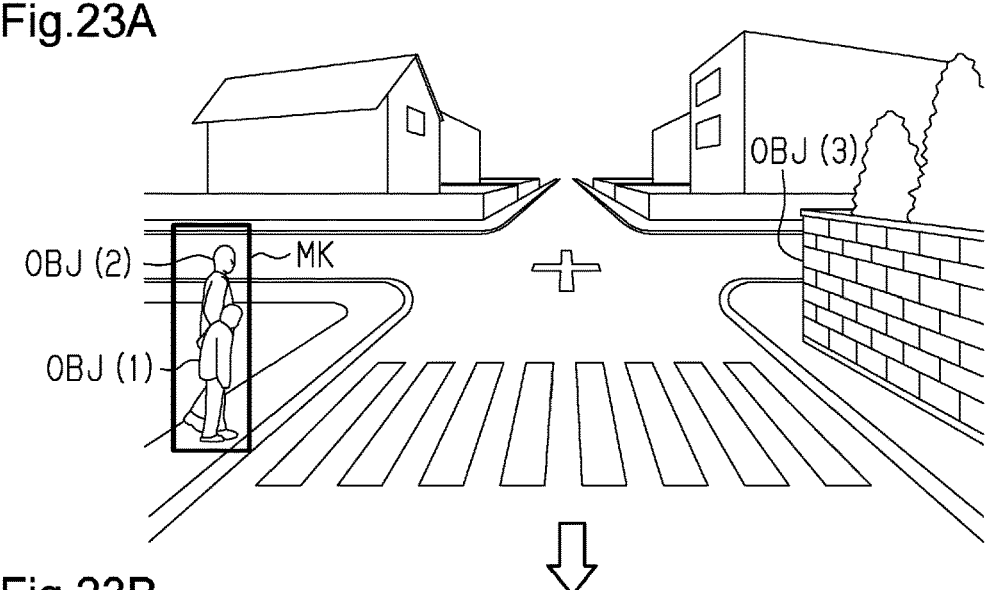
Fig.23B
| Subject Object | OBJ (1) | OBJ (2) | OBJ (3) |
|---|---|---|---|
| Status | Indeterminable | Indeterminable | Determinable |
Fig.23C
| Subject Object | OBJ (1) | OBJ (2) | OBJ (3) |
|---|---|---|---|
| Status | Looked | Looked | Determinable |
Fig.23D
| Subject Object | OBJ (1) | OBJ (2) | OBJ (3) |
|---|---|---|---|
| Status | Permitting Driving | Permitting Driving | Indeterminable |
Fig.23E
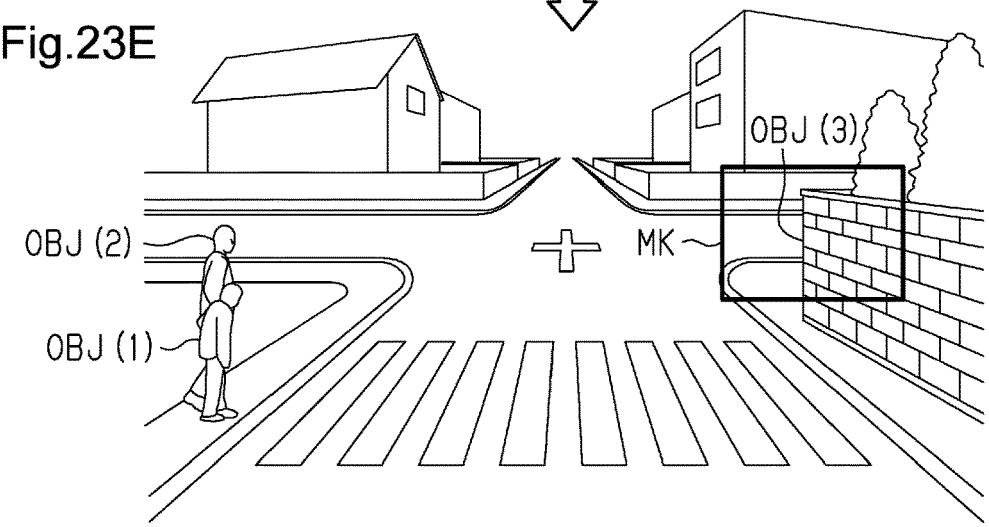

the controller permits autonomous driving of the vehicle. In this manner, when it is difficult for the controller to determine whether autonomous driving of the vehicle is permissible, the controller asks the intention of the driver so that the judgement of the driver can aid the determination process of the controller. Further, the controller determines whether the driver is giving an instruction to drive the vehicle based on the action of the driver recognized from the image data. Thus, the intention of the driver can be easily conveyed without the driver performing a manual operation using an input device.

Other features and aspects will be apparent from the following detailed description, the drawings, and the claims.

TRAVEL CONTROLLER, METHOD FOR CONTROLLING TRAVELING, AND COMPUTER READABLE STORAGE MEDIUM STORING TRAVEL CONTROL PROGRAM

FIELD

The following description relates to a travel controller, a method for controlling traveling, and a computer readable storage medium storing a travel control program.

DESCRIPTION OF RELATED ART

International Publication No. 2017/130643 describes a travel controller installed in a vehicle to detect a moving object that may move toward the vehicle when the vehicle approaches a crosswalk. Specifically, the controller detects the road configuration around the subject crosswalk, predicts a movement line of the moving object crossing the subject crosswalk based on the road configuration, and detects the moving object in a detection area including the predicted movement line.

The controller cannot determine whether a person, such as a crossing guard, who is standing near the crosswalk intends to walk across the crosswalk. This may keep the vehicle stopped when not necessary.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a travel controller includes circuitry configured to execute an action recognizing process, a travel permissible information obtaining process, an inquiring process, a determination process, and an autonomous driving permitting process. The action recognizing process is for recognizing an action of a driver of a vehicle from image data of the driver. The travel permissible information obtaining process is for obtaining information indicating that determination of whether autonomous driving of the vehicle is permissible cannot be given. The inquiring process is for operating a human interface to request the driver for an instruction to drive the vehicle when the information indicating that determination of whether autonomous driving of the vehicle is permissible cannot be given is obtained. The determination process is for determining whether the driver is giving an instruction to drive the vehicle from an action recognized in the action recognizing process taken in response to the inquiring process. The autonomous driving permitting process is for permitting autonomous driving of the vehicle by operating a drive system of the vehicle when determined in the determination process that the driver is giving an instruction to drive the vehicle.

In the above configuration, when the information indicating that determination of whether autonomous driving of the vehicle is permissible cannot be given is obtained, the human interface is operated to request the driver for an instruction to drive the vehicle. As a result of the inquiry, the controller determines whether the driver is giving an instruction to drive the vehicle from the action of the driver recognized from the image data. When determining that the driver is giving an instruction to drive the vehicle, the

BRIEF DESCRIPTION OF THE DRAWINGS

FIGS. 20A, 20B, 20C, and 20D are diagrams showing the operation of the second embodiment.

FIGS. 23A, 23B, 23C, 23D, and 23E are diagrams showing a modified example of the second embodiment.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

First Embodiment

A first embodiment will now be described with reference to the drawings.

Figure 1:
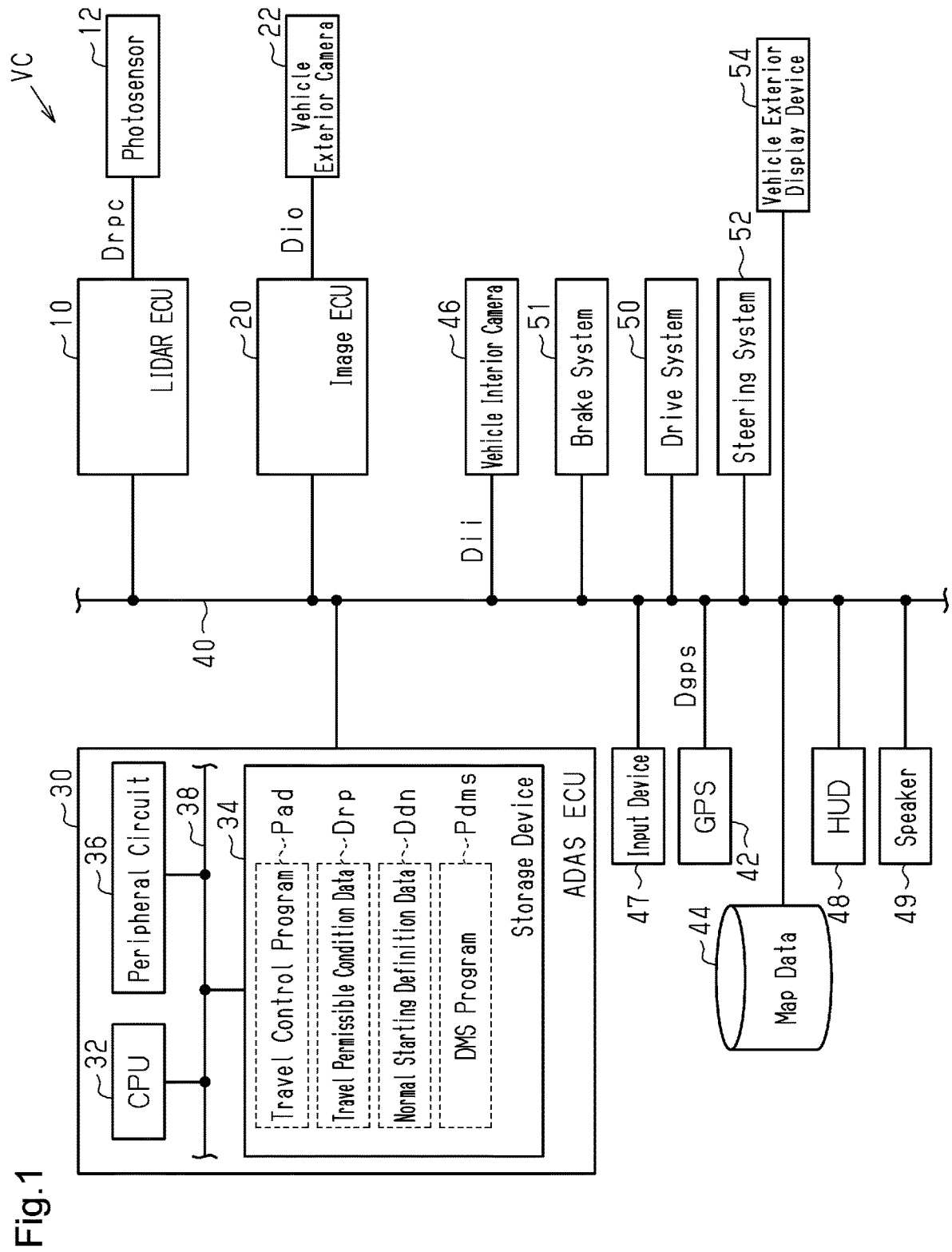
FIG. 1 is a block diagram showing the configuration of an in-vehicle control system in accordance with a first embodiment.

FIG. 1 shows a device installed in a vehicle VC in accordance with the present embodiment. A photosensor 12 shown in FIG. 1 emits, for example, a laser beam of near-infrared light or the like. Also, the photosensor 12 receives reflection light of the laser beam and generates distance measurement point data that indicates a distance variable, a direction variable, and a strength variable. The distance variable indicates the distance between the vehicle and the object reflecting the laser beam. The direction variable indicates the direction in which the laser beam was emitted. The strength variable indicates the reflection strength of the object reflecting the laser beam. The distance measurement point data is obtained by, for example, a time of flight (TOF) method. Alternatively, the distance measurement point data may be generated through a frequency modulated continuous wave (FMCW) method instead of TOF. In this case, the distance measurement point data may include a speed variable that indicates the relative velocity between the vehicle and the object reflecting the laser beam.

The photosensor 12 emits the laser beam to cyclically scan the horizontal direction and the vertical direction and output the distance measurement point data group Drpc that is the group of the collected distance measurement point data.

A LIDAR electronic control unit (ECU) 10 uses the distance measurement point data group Drpc to execute a recognition process on the object that reflected the laser beam. The recognition process may include, for example, a clustering process of the distance measurement point data group Drpc. Further, the recognition process may include a process for extracting a characteristic amount of the measurement point data group that is determined as a single object in the clustering process and inputting the extracted characteristic amount to a discriminative model in order to determine whether the object is a predetermined object. Instead, the recognition process may be a process for recognizing an object by directly inputting the distance measurement point data group Drpc to a deep-learning model.

A vehicle exterior camera 22 outputs the vehicle exterior image data Dio related to the outside of the vehicle VC. An image ECU 20 uses the vehicle exterior image data Dio of the images captured by the vehicle exterior camera 22 to execute a recognition process of the objects around the vehicle.

An advanced driver-assistance system (ADAS) ECU 30 executes a process for controlling traveling of the vehicle VC. When controlling traveling of the vehicle VC, the ADAS ECU 30 receives the recognition result from each of the LIDAR ECU 10 and the image ECU 20 via a local network 40. Further, when controlling traveling of the vehicle VC, the ADAS ECU 30 refers to the position data Dgps of the global positioning system (GPS) 42 and the map data 44 via the local network 40. In addition, when controlling traveling of the vehicle, the ADAS ECU 30 refers to the vehicle interior image data Dii related to the interior of the vehicle VC obtained by a vehicle interior camera 46. The vehicle interior camera 46 mainly captures an image of the driver. When controlling traveling of the vehicle VC, the ADAS ECU 30 also operates a heads-up display (HUD) 48, a speaker 49, a drive system 50, a brake system 51, a steering system 52 and a vehicle exterior display device 54 while referring to the operation state of an input device 47. The input device 47 is a means for conveying the intention of the driver through manual operations. The HUD 48 is an example of a human interface and provides the driver with visual information. The vehicle exterior display device 54 is a device that presents visual information to the outside of the vehicle VC. The drive system 50 may be formed by only one of an internal combustion engine and a rotating electrical machine.

More specifically, the ADAS ECU 30 includes a central processing unit (CPU) 32, a storage device 34, and peripheral circuit 36. A local network 38 allows for communication between the CPU 32, the storage device 34, and the peripheral circuit 36. The peripheral circuit 36 includes a circuit that generates clock signals used for internal actions, a power source circuit, a reset circuit, and the like. The ADAS ECU 30 executes an autonomous driving process when the CPU 32 executes a program stored in the storage device 34. Further, the ADAS ECU 30 executes a driver monitoring process to act as a driver monitoring system (DMS). The ADAS ECU 30 performs the above-described processes when the CPU 32 executes the travel control program (Pad) and the DMS program Pdms that are stored in the storage device 34. In the present embodiment, the DMS includes the ADAS ECU 30 and the vehicle interior camera 46.

Figure 2:
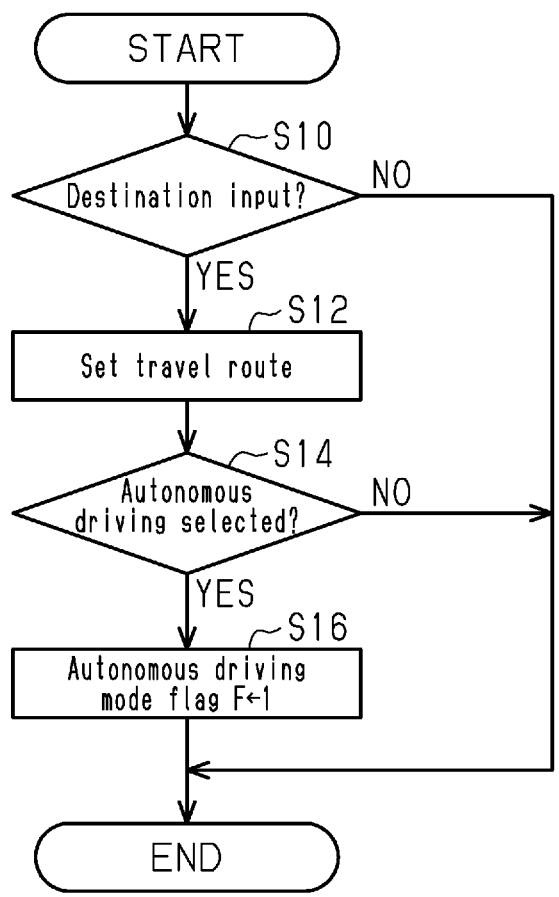
FIG. 2 is a flowchart illustrating a process related to autonomous driving in accordance with the first embodiment.

FIG. 2 illustrates part of the autonomous driving process in accordance with the present embodiment. The process shown in FIG. 2 is implemented, for example, when the CPU 32 repeatedly executes the travel control program (Pad) stored in the storage device 34 in predetermined cycles. In the following description, the letter "S" preceding a numeral indicates a step number of a process.

In the process shown in FIG. 2, the CPU 32 first determines whether a destination has been input by the driver through a manual operation of the input device 47 (S10). When the CPU 32 determines that the destination has been input (S10: YES), the CPU 32 sets a route from the present location to the destination (S12). Specifically, the CPU 32 sets a travel route using link information of lanes from the present location to the destination that is included in the map data 44. When multiple lanes extend in the same direction, the CPU 32 selects the lane that would be more preferred than the other lanes as the target route. For example, when a left turn is to be made at the next intersection, the CPU 32 selects the left lane as part of the target route.

Then, the CPU 32 determines whether the driver has selected autonomous driving as the operation state of the input device 47 (S14). When the CPU 32 determines that autonomous driving is selected (S14: YES), the CPU 32 sets the autonomous driving mode flag F to "1" (S16).

When step S16 is completed or when a negative determination is given in step S10 or S14, the CPU 32 temporarily ends the process shown in FIG. 2.

Figure 3:
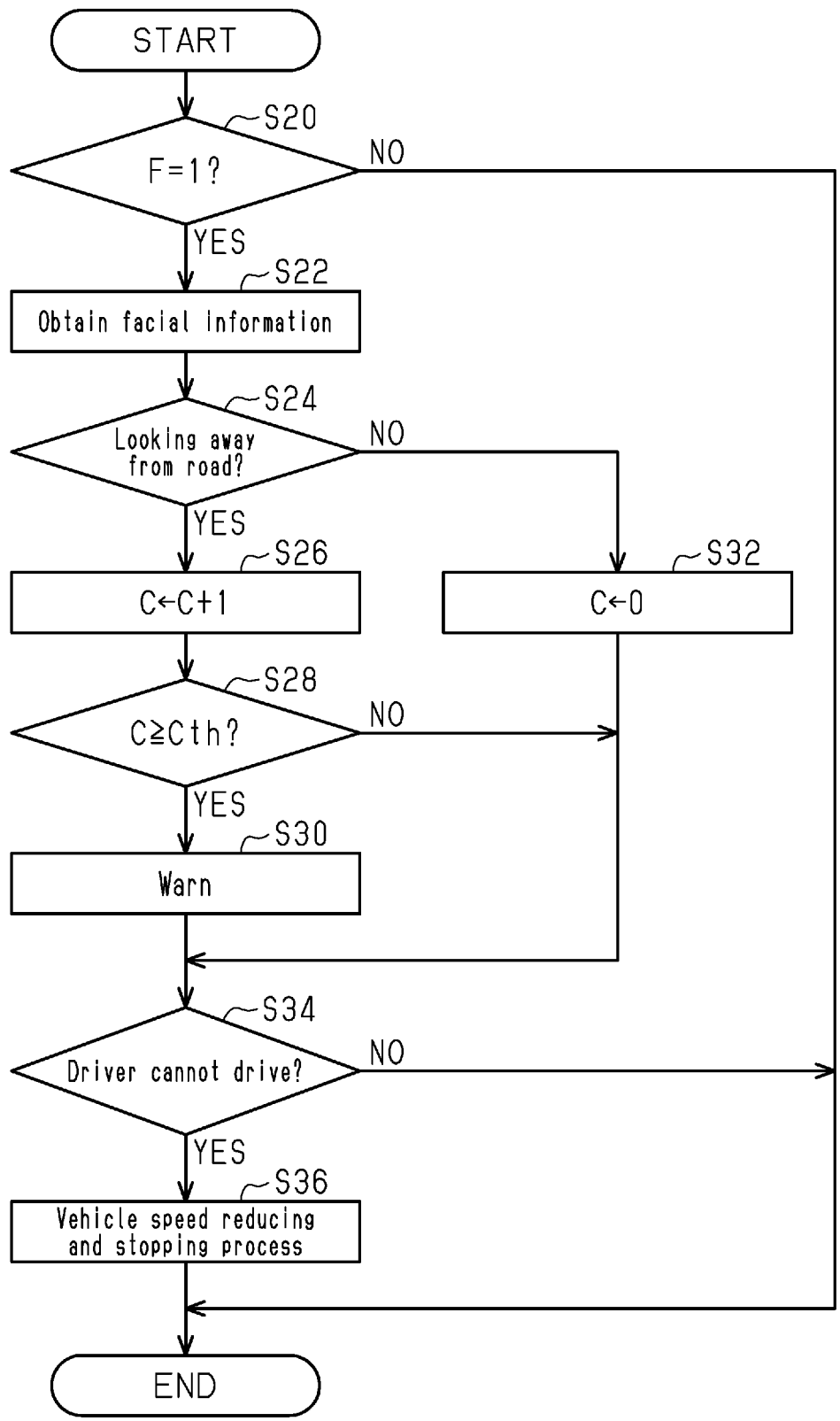
FIG. 3 is a flowchart illustrating a process based on a DMS program and a travel control program in accordance with the first embodiment.

FIG. 3 illustrates part of the driver monitoring process and the autonomous driving process. The process of FIG. 3 is implemented, for example, when the CPU 32 repeatedly executes the travel control program (Pad and the DMS program Pdms stored in the storage device 34 in predetermined cycles. The cycle in which the process of FIG. 3 is executed is shorter than the cycle in which the process of FIG. 2 is executed.

In the process shown in FIG. 3, the CPU 32 first determines whether the autonomous driving mode flag F is "1" (S20). When the CPU 32 determines that the autonomous driving mode flag F is "1" (S20: YES), the CPU 32 obtains facial information of the driver from the vehicle interior image data Dii output from the vehicle interior camera 46 (S22). Then, the CPU 32 determines whether the driver is looking away from the road (S24). When the CPU 32 determines that the driver is looking away from the road (S24: YES), the CPU 32 makes an increment to a counter C (S26). Subsequently, the CPU 32 determines whether the counter C is greater than or equal to a predetermined value Cth (S28). When the CPU 32 determines that the value of the counter C is greater than or equal to the predetermined value Cth (S28: YES), the CPU 32 operates the speaker 49 shown in FIG. 1 to issue a warning sound to prompt the driver to be ready to manually drive the vehicle at any time (S30).

When a negative determination is given in step S24, the CPU 32 initializes the counter C (S32). When step S30 or S32 is completed or when a negative determination is given in step S28, the CPU 32 determines whether the driver cannot drive the vehicle, such as when the driver is unconscious (S34). When the CPU 32 determines that the driver cannot drive the vehicle (S34: YES), the CPU 32 operates the brake system 51 to reduce the speed of the vehicle and pull the vehicle aside to a shoulder of the road or the like as the vehicle stops (S36).

When step S36 is completed or when a negative determination is given in step S20 or S34, the CPU 32 temporarily ends the process shown in FIG. 3. Steps S20 to S34 are implemented when the CPU 32 executes the DMS program Pdms, and step S36 is implemented when the CPU 32 executes the travel control program (Pad).

Figure 4:
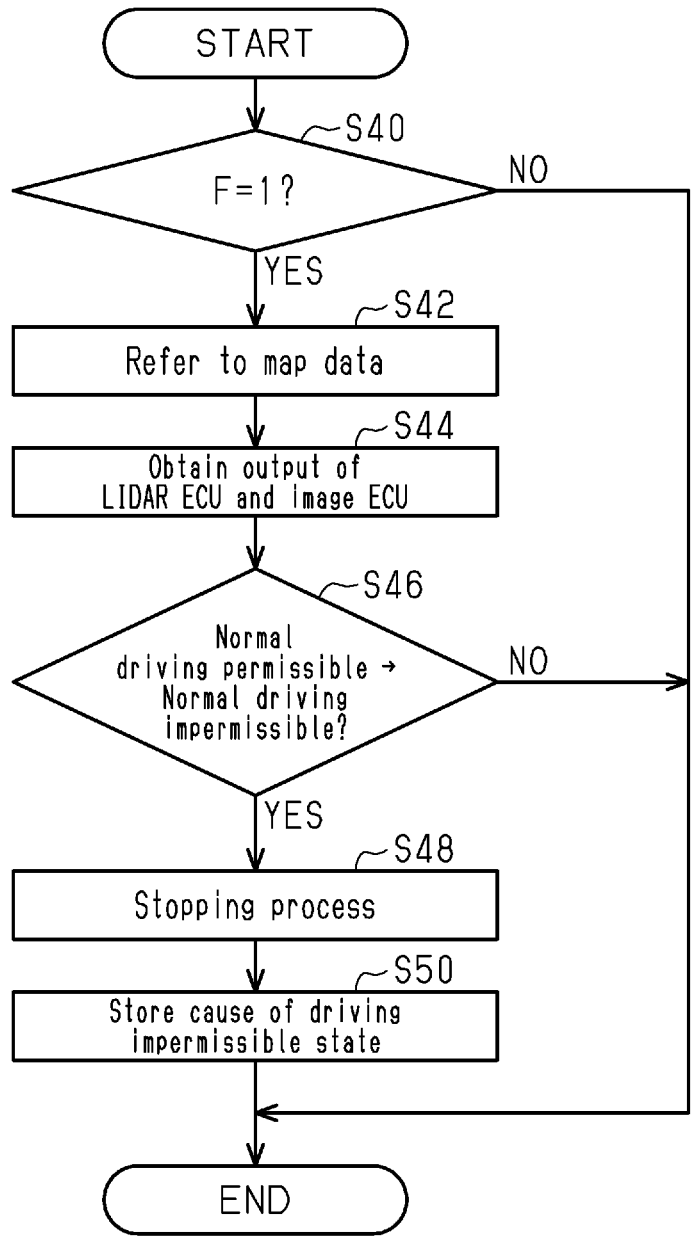
FIG. 4 is a flowchart illustrating a process based on the travel control program in accordance with the first embodiment.

FIG. 4 illustrates part of the autonomous driving process. The process of FIG. 4 is implemented, for example, when the CPU 32 repeatedly executes the travel control program (Pad) stored in the storage device 34 in predetermined cycles. The cycle in which the process of FIG. 4 is executed is shorter than the cycle in which the process of FIG. 2 is executed.

In the process shown in FIG. 4, the CPU 32 first determines whether the autonomous driving mode flag F is "1" (S40). When the CPU 32 determines that the autonomous driving mode flag F is "1" (S40: YES), the CPU 32 refers to the map data 44 related to the present location, which is obtained from the position data Dgps (S42). Then, the CPU 32 obtains outputs from the LIDAR ECU 10 and the image ECU 20 (S44).

The CPU 32 determines whether the state of the vehicle has shifted from a state in which autonomous driving of the vehicle is permissible to a state in which autonomous driving of the vehicle is impermissible using the map data and the obtained outputs (S46). This process is executed by the CPU 32 to determine from the map data and the obtained outputs whether the vehicle has shifted from a state that satisfies a travel permissible condition to a state that does not satisfy the travel permissible condition. The travel permissible condition is defined by the travel permissible condition data Drp stored in the storage device 34 shown in FIG. 1. The travel permissible condition is a condition in which the vehicle can be driven through autonomous driving. For example, the travel permissible condition is that there is no obstacle in the traveling direction of the vehicle. More specifically, when there is a traffic light, the travel permissible condition includes that the traffic light is green in addition to that there is no obstacle in the traveling direction of the vehicle. Moreover, at a crosswalk where there is no traffic light, the travel permissible condition includes that there is no person near the crosswalk in addition to that there is no obstacle in the traveling direction of the vehicle.

When the CPU 32 determines that the state has shifted to a state in which autonomous driving of the vehicle is impermissible (S46: YES), the CPU 32 operates the brake system 51 to execute a stopping process (S48). Then, the CPU 32 specifies the object that caused autonomous driving of the vehicle to become impermissible and stores the object in the storage device 34 (S50). For example, when an obstacle is detected in the traveling direction based on the output of the LIDAR ECU 10 and the output of the image ECU 20, the CPU 32 stores the coordinates of the detected obstacle in the storage device 34.

When step S50 is completed or when a negative determination is given in step S40 or S46, the CPU 32 temporarily ends the process shown in FIG. 4.

Figure 5:
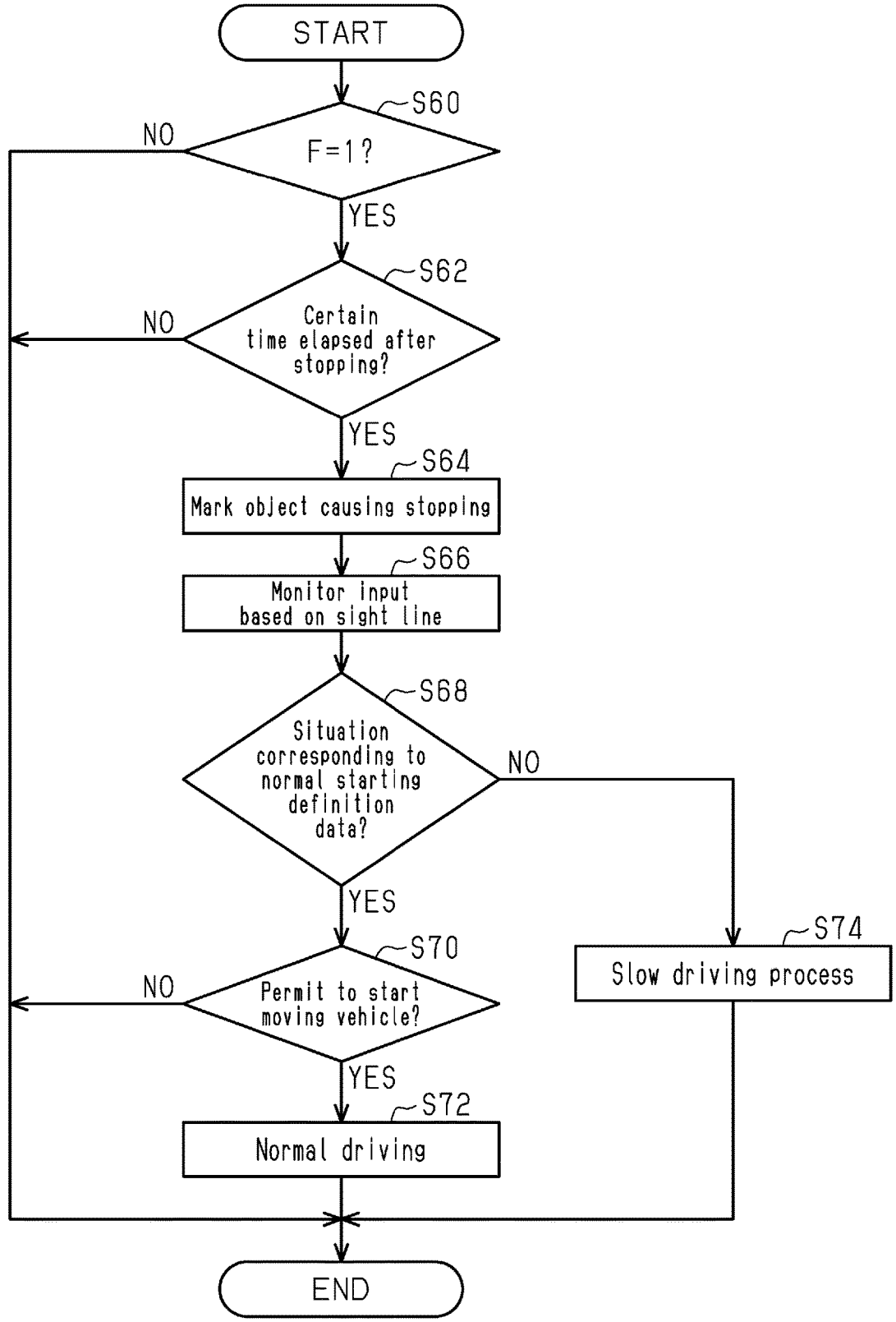
FIG. 5 is a flowchart illustrating a process based on the travel control program in accordance with the first embodiment.

FIG. 5 illustrates part of the autonomous driving process. The process of FIG. 5 is implemented, for example, when the CPU 32 repeatedly executes the travel control program (Pad) stored in the storage device 34 in predetermined cycles. The cycle in which the process of FIG. 5 is executed is shorter than the cycle in which the process of FIG. 2 is executed.

In the process shown in FIG. 5, the CPU 32 first determines whether the autonomous driving mode flag F is "1" (S60). When the CPU 32 determines that the autonomous driving mode flag F is "1" (S60: YES), the CPU 32 determines whether a certain time has elapsed after stopping in S48 (S62). Step S62 corresponds to a travel permissible information obtaining process. The certain time may be set to, for example, a time allowing for determination that the vehicle will not return to the state satisfying the travel permissible condition and resume autonomous driving no longer how much time further elapses.

When the CPU 32 determines that a certain time has elapsed (S62: YES), the CPU 32 operates the HUD 48 to mark the surrounding of the object stored in step S50 that caused driving of the vehicle to become impermissible (S64). Step S64 corresponds to an inquiring process.

Figure 6A:
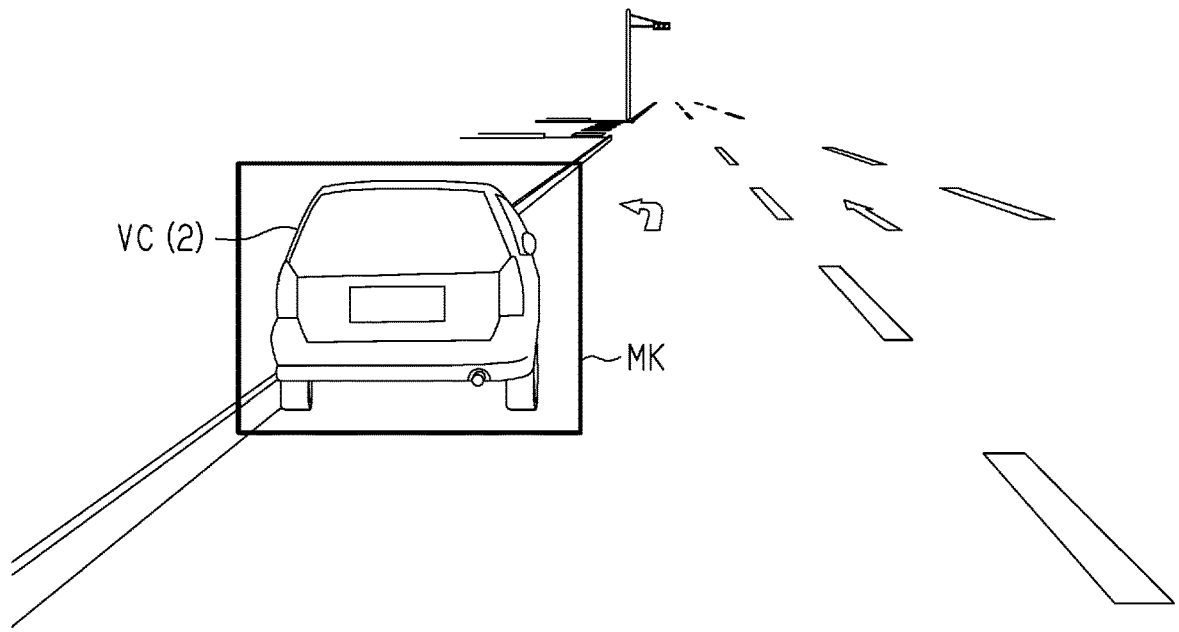
FIG. 6A is a diagram of an example shown in a heads-up display.

FIG. 6A shows an example of a marking MK when the cause that caused driving of the vehicle VC(1) to become impermissible is a stopped vehicle VC(2) in front of the vehicle VC(1) driven by the driver. The situation shown in FIG. 6A corresponds to the situation shown in FIG. 6B. Specifically, the vehicle VC(2) is stopped in front of a vehicle VC(1), which is driven by the driver, when the vehicle VC(1) is traveling in lane TR1, which is the leftmost one of lanes TR1, TR2, and TR3 extending in the same direction as the traveling direction. This situation does not satisfy the travel permissible condition and thereby stops the vehicle VC(1). In this example, the vehicle VC(1) is set to make a left turn at the next intersection. Thus, lane TR1 is selected as the traveling route of the vehicle VC(1). Further, the vehicle VC(2) is stopped relatively far from the intersection and there is no other vehicle between the vehicle VC(2) and the intersection.

As shown in FIG. 5, the CPU 32 monitors the vehicle interior image data Dii, which is obtained by the vehicle interior camera 46, to monitor inputs based on the line of sight of the driver (S66). Step S66 corresponds to an action recognizing process. The driver is informed in advance that his or her line of sight will allow the intention of the driver to be conveyed. Specifically, the driver is informed in advance that when his or her line of sight is directed toward the marked object, this will indicate that the driver does not intend to start moving the vehicle VC(1). Further, when directing his or her line of sight toward a lane in which the vehicle VC(1) can travel, this will indicate that the driver intends to start moving the vehicle VC(1). Accordingly, in the example of FIGS. 6A and 6B, when the driver directs his or her line of sight toward lane TR2, this will indicate that the driver is intending to drive around the vehicle VC(2).

Then, the CPU 32 determines whether the situation of the vehicle VC(1) corresponds to a normal starting permissible condition defined by normal starting definition data Ddn, which is stored in the storage device 34 shown in FIG. 1 (S68). The normal starting permissible condition is set to a condition allowing for determination that when the driver shows his or her intention to start moving the vehicle VC(1), the probability for encountering a dangerous situation will be extremely low if the vehicle VC(1) is normally started and then shifted to normal driving. For example, in FIGS. 6A and 6B, there will be no particular problem when the driver starts moving the vehicle VC(1) and changes lanes to lane TR2 since no other vehicle is traveling in lane TR2 and no other vehicle is changing lanes and entering lane TR2. Accordingly, in the present embodiment, when the vehicle VC(1) is changing lanes, the normal starting permissible condition includes a condition in that no other vehicle or the like is traveling near the vehicle VC(1) and the lane which the vehicle VC(1) is entering has no obstacle.

When the CPU 32 determines that the normal starting permissible condition is satisfied (S68: YES), the CPU 32 determines whether the driver is instructing the vehicle VC(1) to be driven through an input based on the line of sight, in other words, whether the driver is permitting the vehicle VC(1) to start moving (S70). Step S70 corresponds to a determination process. When the CPU 32 determines that the driver is instructing the vehicle VC(1) to be driven (S70: YES), the CPU 32 operates the drive system 50 to start moving the vehicle VC(1) and proceeds to normal driving (S72). Step S72 corresponds to an autonomous driving permitting process. Also, step S72 corresponds to a process for operating the drive system in a normal driving mode.

Figure 6B:
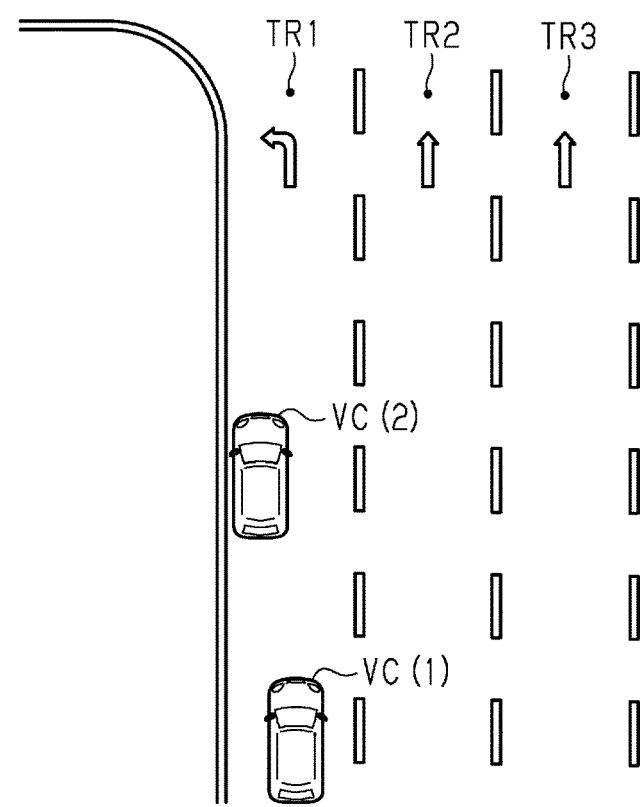
FIG. 6B is a diagram showing the traffic situation.

For example, in FIGS. 6A and 6B, when the driver directs his or her line of sight toward lane TR2, the CPU 32 operates the drive system 50 to start moving the vehicle VC(1) and operates the steering system 52 to change lanes so that the vehicle VC(1) enters lane TR2.

Figure 7:
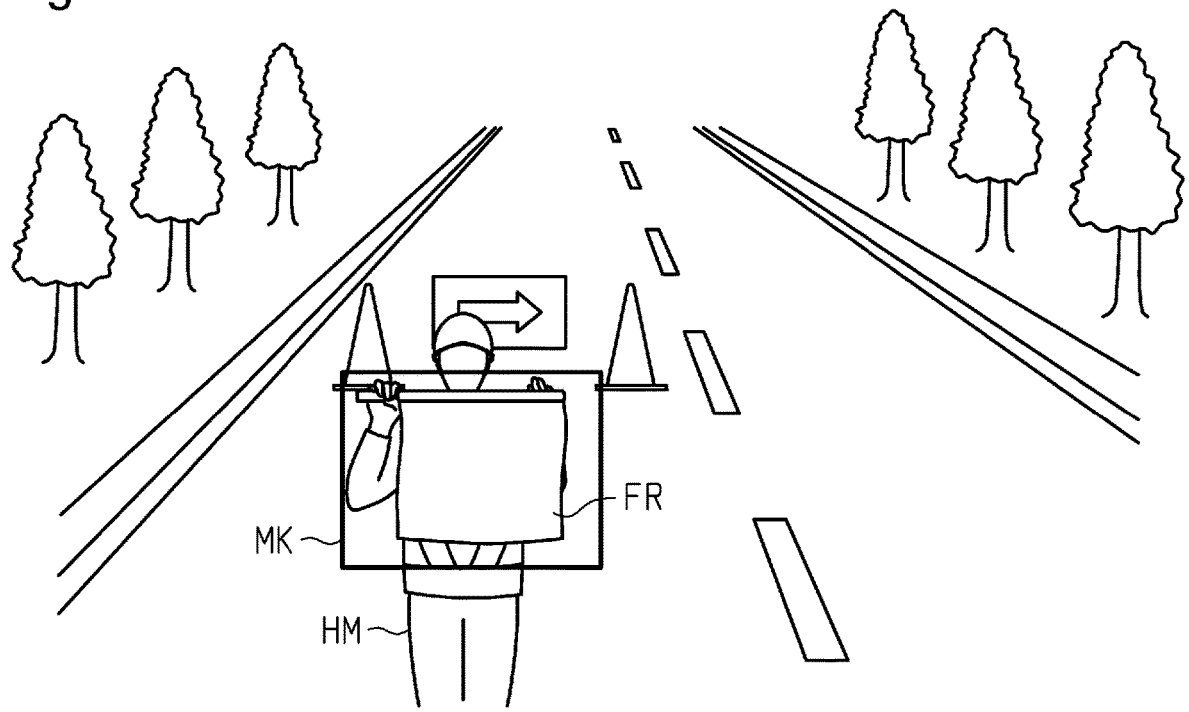
FIG. 7 is a diagram of an example shown on the heads-up display in accordance with the first embodiment.

Further, in the example of FIG. 7, when a red flag FR held by a person HM is indicated by the marking MK and the driver then directs his or her line of sight toward the right lane, the CPU 32 starts moving the vehicle VC(1) and changes lanes to enter the right lane.

Figure 8:
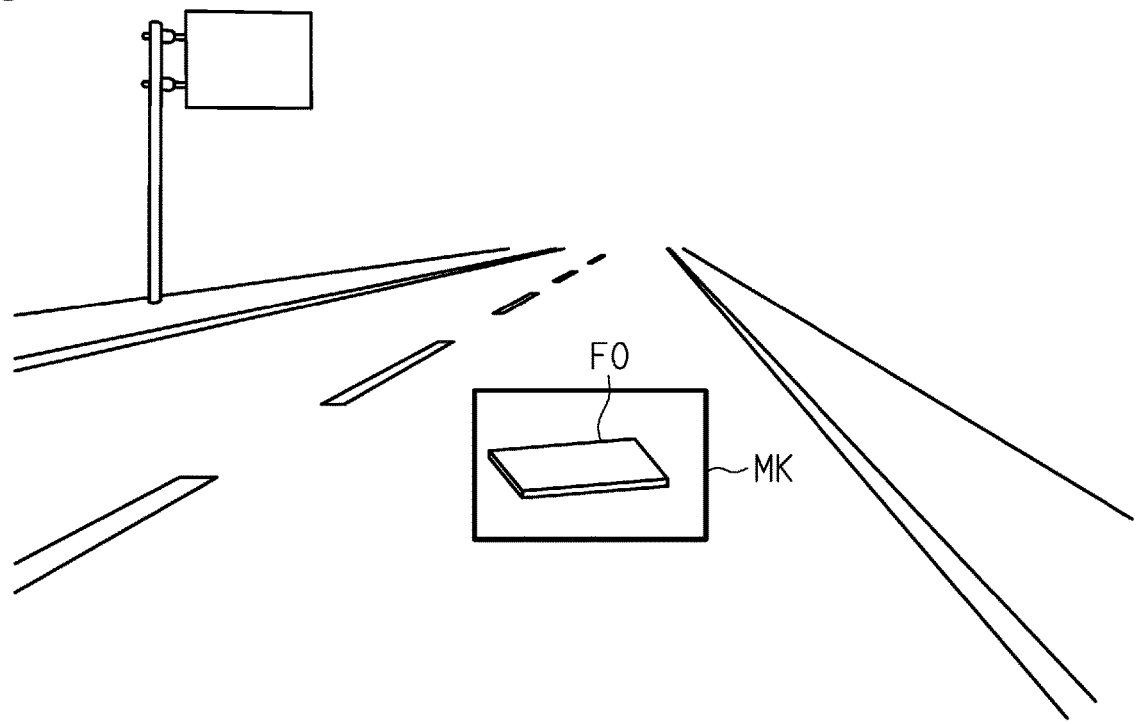
FIG. 8 is a diagram of an example shown on the heads-up display in accordance with the first embodiment.

In the example of FIG. 8, when a fallen object FO in the traveling direction is indicated by the marking MK and the driver then directs his or her line of sight toward the left lane that is separated from the fallen object FO, the CPU 32 starts moving the vehicle VC(1) and changes lanes to enter the left lane.

As shown in FIG. 5, when a negative determination is given in step S68, the CPU 32 proceeds to step S74. When step S72 or S74 is completed or when a negative determination is given in step S60, S62, or S70, the CPU 32 temporarily ends the process shown in FIG. 5.

Figure 9:
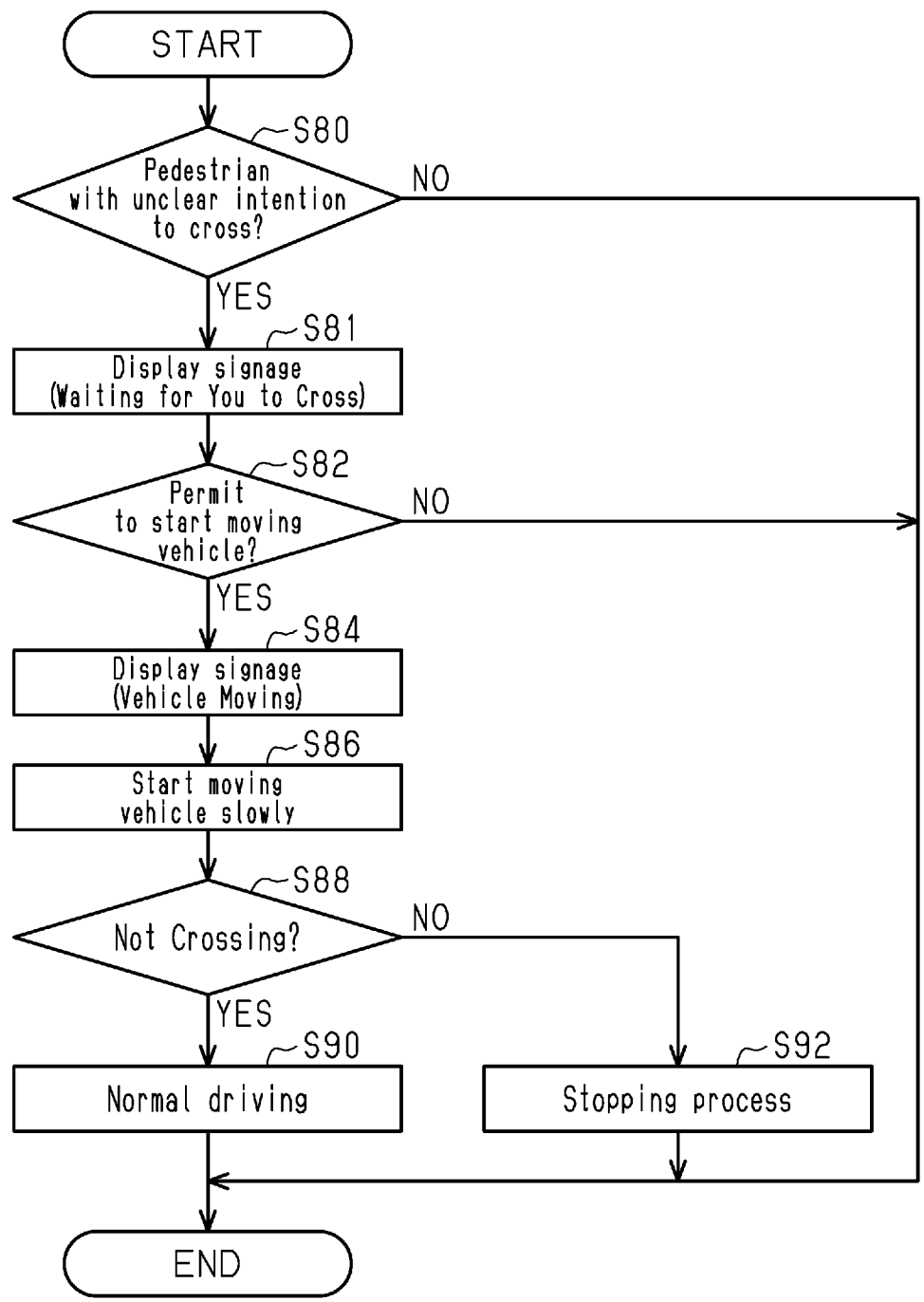
FIG. 9 is a flowchart illustrating a slow driving process in accordance with the first embodiment.

FIG. 9 illustrates an example of the process performed in S74.

In the process shown in FIG. 9, the CPU 32 first determines whether there is a pedestrian near a crosswalk where there is no traffic light whose intention to cross the crosswalk is not clear (S80). The CPU 32 may determine that there is a pedestrian whose intention to cross the crosswalk is unclear when the CPU 32 recognizes a person near the crosswalk from the output of the LIDAR ECU 10 and the output of the image ECU 20. When the CPU 32 determines that there is a pedestrian whose intention to cross a crosswalk is unclear (80: YES), the CPU 32 operates the vehicle exterior display device 54 shown in FIG. 1 to display visual information indicating that the vehicle is waiting for the person to cross the crosswalk (S81).

Such a situation will now be described with reference to FIGS. 10 and 11.

Figure 10:
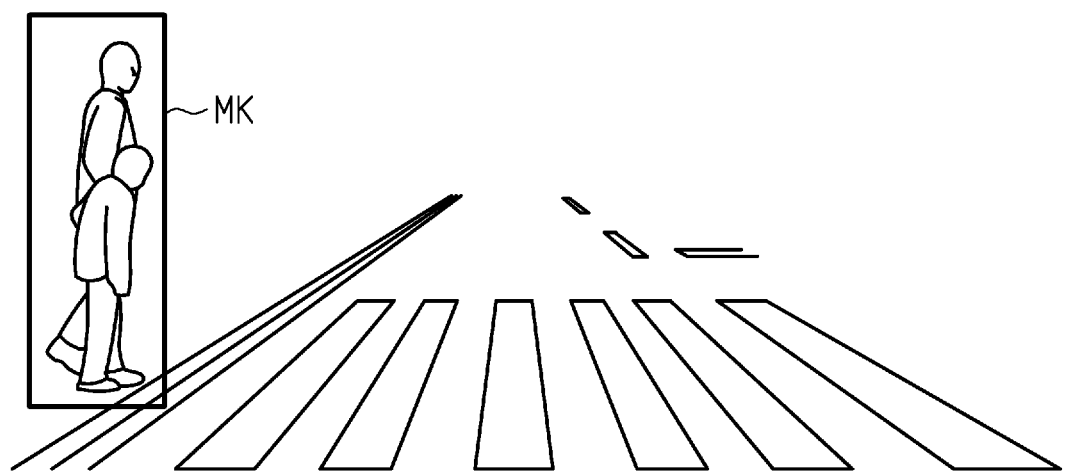
FIG. 10 is a diagram of an example shown on the heads-up display in accordance with the first embodiment.

FIG. 10 is a diagram of an example shown on the HUD 48 in a situation where step S80 is performed. In the example of FIG. 10, two persons are standing near the crosswalk, and the marking MK surrounds these persons.

Figure 11:
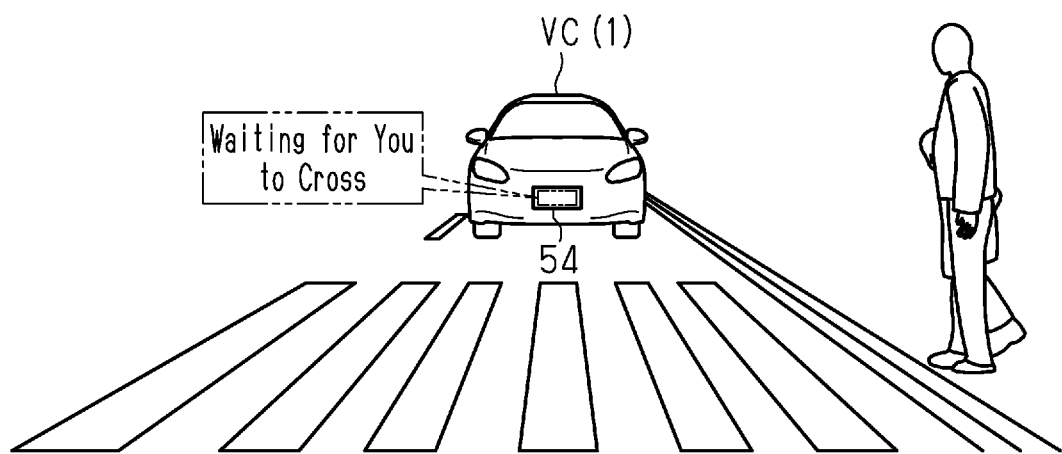
FIG. 11 is a diagram of a signage display in accordance with the first embodiment.

FIG. 11 shows an example of the process performed in S81. In the example of FIG. 11, the vehicle exterior display device 54 displays the phrase "Waiting for You to Cross".

As shown in FIG. 9, the CPU 32 determines from the monitoring result of the input based on the line of sight in step S66 whether the driver is instructing the vehicle to travel (S82). Step S82 corresponds to the determination process. When the CPU 32 determines that the driver is instructing the vehicle to travel (S82: YES), the CPU 32 operates the vehicle exterior display device 54 shown in FIG. 1 to display information indicating that the driver is intending to start moving the vehicle (S84). Step S84 corresponds to a process for displaying information on the vehicle exterior display device 54 prompting the pedestrian to be aware that the vehicle will be moving.

Then, the CPU 32 operates the drive system 50 to start moving the vehicle slowly (S86). Step S86 corresponds to the autonomous driving permitting process. Also, step S86 corresponds to a process for operating the drive system in a slow driving mode. Slow driving includes, for example, driving at a speed of 10 km/h or lower, preferably, 5 km/h or lower. After the vehicle starts moving, the CPU 32 confirms that the pedestrian, whose intention to cross the crosswalk was unclear, is not crossing the crosswalk from the output of the LIDAR ECU 10 and the output of the image ECU 20 (S88). When the CPU 32 determines that the pedestrian is not crossing the crosswalk (S88: YES), the CPU 32 proceeds to normal driving of the vehicle (S90). When the CPU 32 determines that the pedestrian is crossing the crosswalk (S88: NO), the CPU 32 operates the brake system 51 to stop the vehicle again (S92).

When step S90 or S92 is completed or when a negative determination is given in step S80 or S82, the CPU 32 temporarily ends the process shown in FIG. 9.

Figure 12:
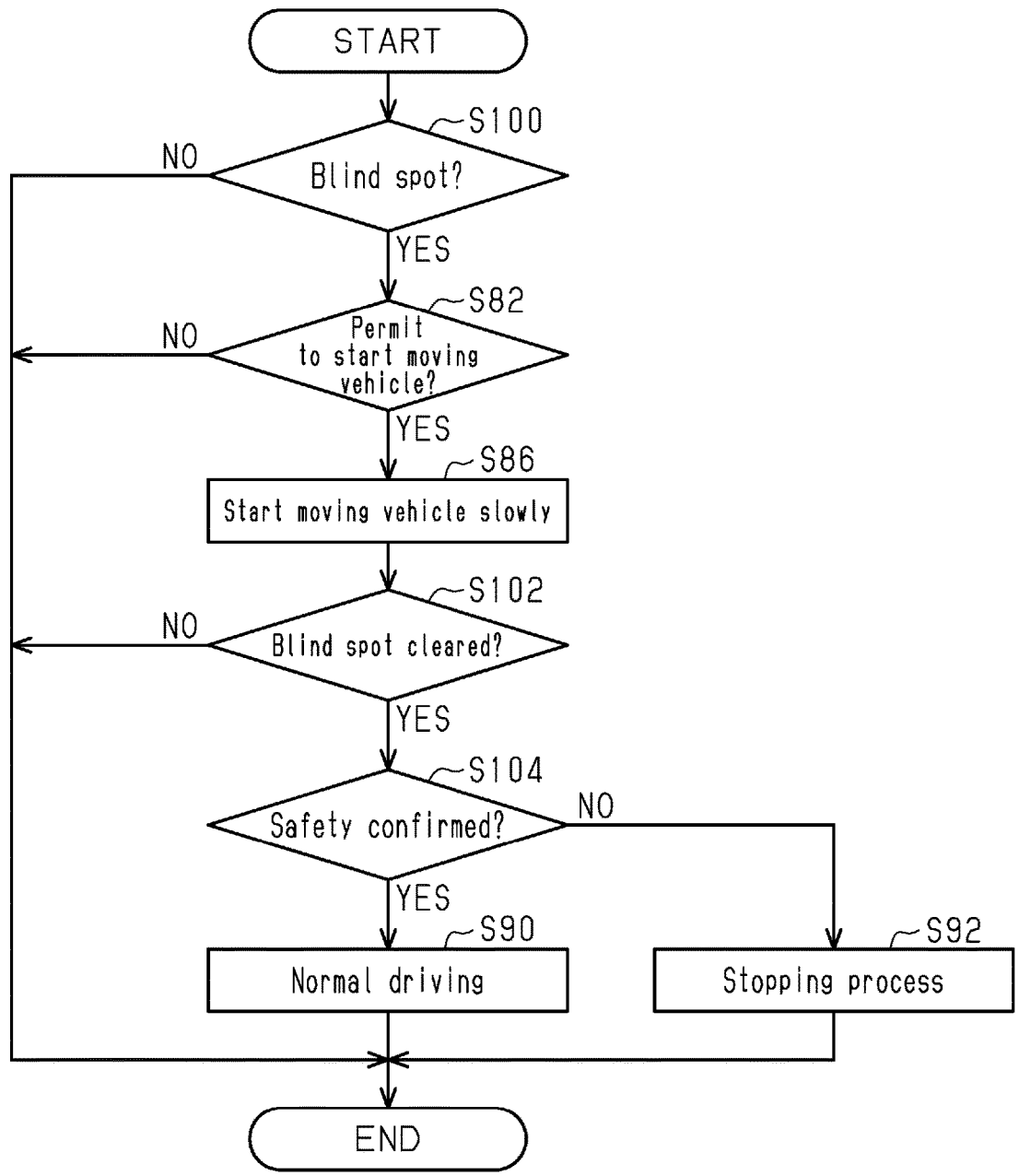
FIG. 12 is a flowchart illustrating a slow driving process in accordance with the first embodiment.

FIG. 12 illustrates another example of the process performed in S74. In FIG. 12, the same step numbers are given to the steps corresponding to the steps shown in FIG. 9. Such steps will not be described in detail.

In the process shown in FIG. 12, the CPU 32 first determines whether there is a blind spot at an intersection where there is no traffic light (S100).

Figure 13:
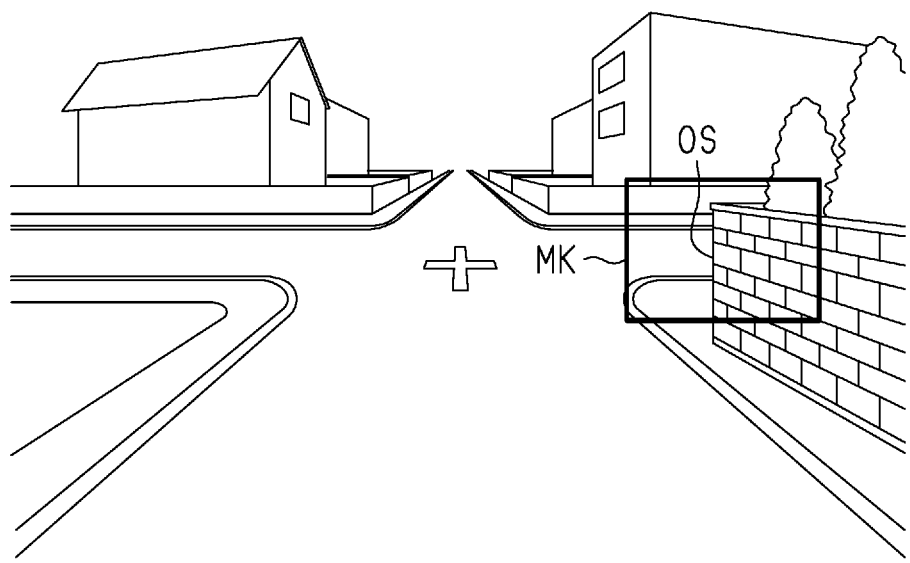
FIG. 13 is a diagram of an example shown on the heads-up display in accordance with the first embodiment.

FIG. 13 shows an example of a blind spot.

In the example of FIG. 13, the marking MK surrounds an object OS because the object OS is obstructing the right view of the lane that intersects the lane in which the vehicle is traveling. In addition to no obstacle being located in front of the traveling vehicle with respect to the traveling direction, the travel permissible condition at an intersection where there is no traffic light is that a lane intersecting the lane of the traveling vehicle is clear of an approaching vehicle. Thus, when the object OS obstructs the view at the right side of an intersecting lane and the right side cannot be checked for an approaching vehicle, the travel permissible condition is not satisfied. This results in an affirmative determination in step S46 of FIG. 4.

As shown in FIG. 12, when the CPU 32 determines that there is a blind spot (S100: YES), the CPU 32 determines from the monitoring result of an input based on the line of sight in step S66 whether the driver is instructing the vehicle to start moving (S82). When the CPU 32 determines that the driver is instructing the vehicle to start moving (S82: YES), the CPU 32 proceeds to step S86. Next, the CPU 32 determines whether the blind spot has been cleared (S102). When the CPU 32 determines that the blind spot has been resolved, or cleared (S102: YES), the CPU 32 determines whether a safety check for vehicles in the cleared field of view has been completed (S104). When safety is confirmed (S104: YES), the CPU 32 proceeds to step S90. When safety is not confirmed (S104: NO), the CPU 32 proceeds to step S92.

When step S90 or S92 is completed or when a negative determination is given in step S100, S82, or S102, the CPU 32 temporarily ends the process shown in FIG. 12.

The operation and advantages of the present embodiment will now be described.

When the travel permissible condition is no longer satisfied in the autonomous driving mode, the CPU 32 executes the stopping process. Subsequently, when the vehicle is stopped for a certain time or longer, the CPU 32 operates the HUD 48 to mark the object that caused the vehicle to stop and requests the driver for permission to start moving the vehicle. In response, the driver directs his or her line of sight toward a lane in which the vehicle can travel to allow the CPU 32 to determine that the driver is instructing the vehicle to be driven and start moving. In this manner, when it is difficult for the ADAS ECU 30 to determine whether autonomous driving of the vehicle is permissible, the judgement of the driver can aid the determination process of the ADAS ECU 30.

The present embodiment described above further has the following operation and advantages.

(1) A request for an instruction to drive the vehicle is given by marking an object causing the vehicle to stop. This notifies the driver of what caused the vehicle to stop. This allows the driver to determine whether driving of the vehicle is permissible more accurately than when requesting the driver for an instruction to drive the vehicle without informing the driver of what caused the vehicle to stop.

(2) The line of sight of the driver is used to determine whether the driver is instructing the vehicle to travel. This simplifies the task that needs to be performed by the driver compared to when the driver is required to use the input device 47 to perform a manual operation. Specifically, when the driver is required to use the input device 47 to perform a manual operation, the driver would have to visually check for safety and then operate the input device 47. Such a manual operation is performed in order to instruct the vehicle to travel. In the present embodiment, the driver can check the marking MK and then instruct the vehicle to travel by moving his or her line of sight. Thus, the intention of the driver can be easily recognized.

(3) When the condition defined by the normal starting definition data Ddn is not satisfied, the vehicle is driven slowly after the vehicle starts to move until safety is confirmed. This improves safety as compared with when the vehicle immediately returns to normal driving after the vehicle starts to move.

(4) When the vehicle is stopped at a crosswalk where there is no traffic light, the vehicle exterior display device 54 shows information indicating that the vehicle is waiting for the pedestrian to cross the crosswalk. This allows the person near the crosswalk to know what is intended.

(5) When the vehicle starts to move after stopping at a crosswalk where there is no traffic light, the vehicle exterior display device 54 shows information indicating that the vehicle will start moving before it does. This prompts the pedestrian to be aware of such a situation and improves safety.

(6) The inquiring process is implemented by using the functionality of the existing driver monitoring system. This allows the inquiring process to be executed without adding a new hardware means.

Second Embodiment

A second embodiment will now be described with reference to the drawings. The description will mainly focus on differences from the first embodiment.

Figure 14:
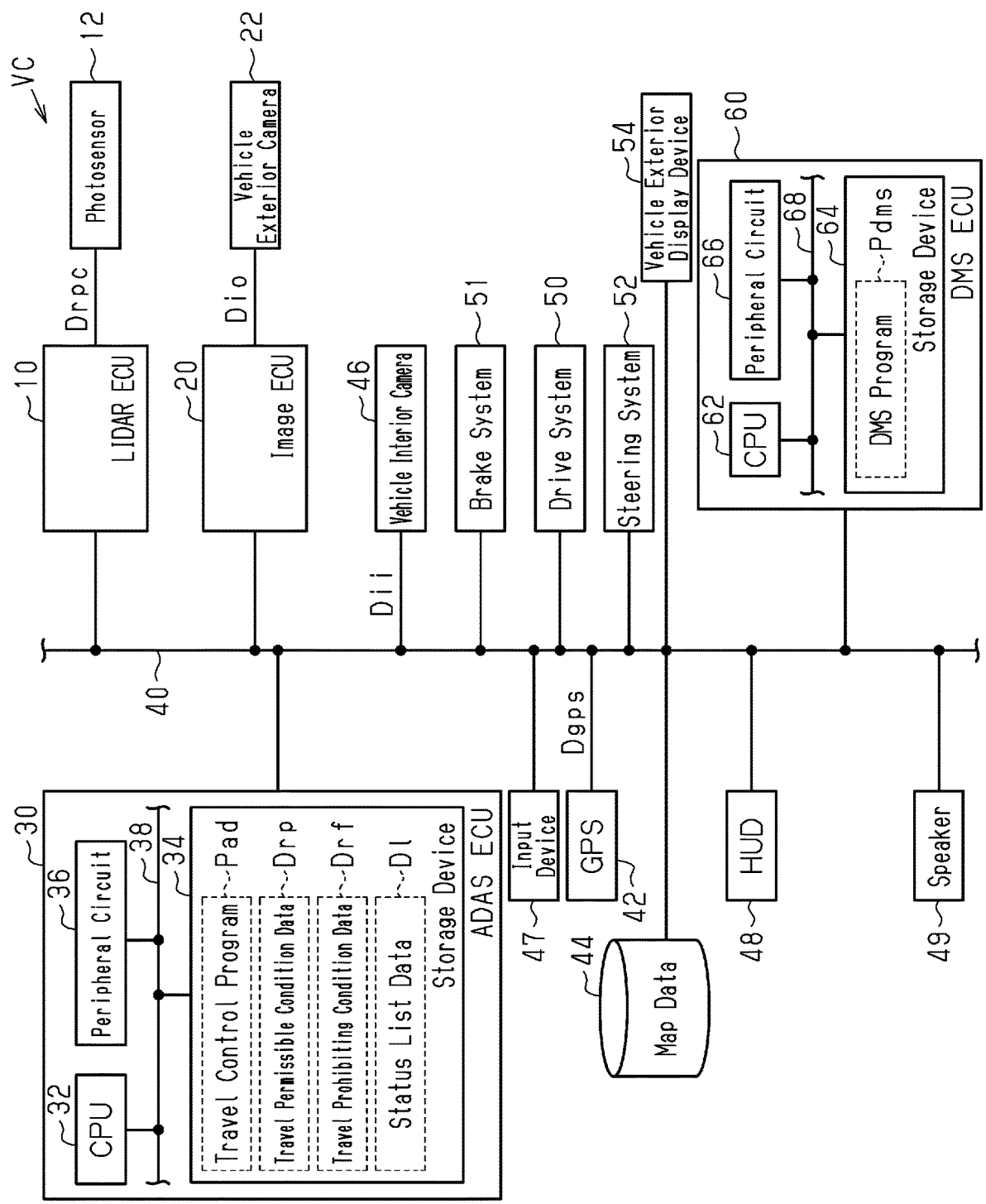
FIG. 14 is a block diagram showing the configuration of an in-vehicle control system in accordance with a second embodiment.

FIG. 14 shows a device installed in the vehicle VC in accordance with the present embodiment. In FIG. 14, the same reference numerals are given to the components that are the same as the components shown in FIG. 1.

As shown in FIG. 14, the vehicle VC of the present embodiment includes a DMS electronic control unit (ECU) 60 that is separate from the ADAS ECU 30. The DMS ECU 60 includes a central processing unit (CPU) 62, a storage device 64, and a peripheral circuit 66, which are configured to establish communication with one another through a local network 68. The storage device 64 stores the DMS program Pdms. The CPU 62 executes the DMS program Pdms stored in the storage device 64 to perform steps S20 to S34 illustrated in FIG. 3.

The DMS program Pdms is not stored in the storage device 34 of the ADAS ECU 30. Further, the storage device 34 does not store the normal starting definition data Ddn. The storage device 34 stores travel prohibiting condition data Drf and status list data Dl. The travel prohibiting condition data Drf specifies a travel prohibiting condition in which driving of the vehicle VC is prohibited. The travel prohibiting condition is, for example, that a traffic light is red at an intersection.

When both of the travel permissible condition and the travel prohibiting condition are not satisfied, the CPU 32 requests the driver for an instruction to drive the vehicle VC. The CPU 32 uses the status list data Dl when requesting for an instruction. The status list data Dl specifies the status of each object that is checked to determine whether driving of the vehicle VC is permissible. The CPU 32 ultimately determines whether driving of the vehicle is permissible based on the status of each object.

The autonomous driving process will now be described in the order of a process for executing the stopping process in accordance with the status of each object, a process for updating the status of each object based on the line of sight of the driver, and a process related to resuming autonomous driving.

"Process for Executing Stopping Process in Accordance with Status of Object"

Figure 15:
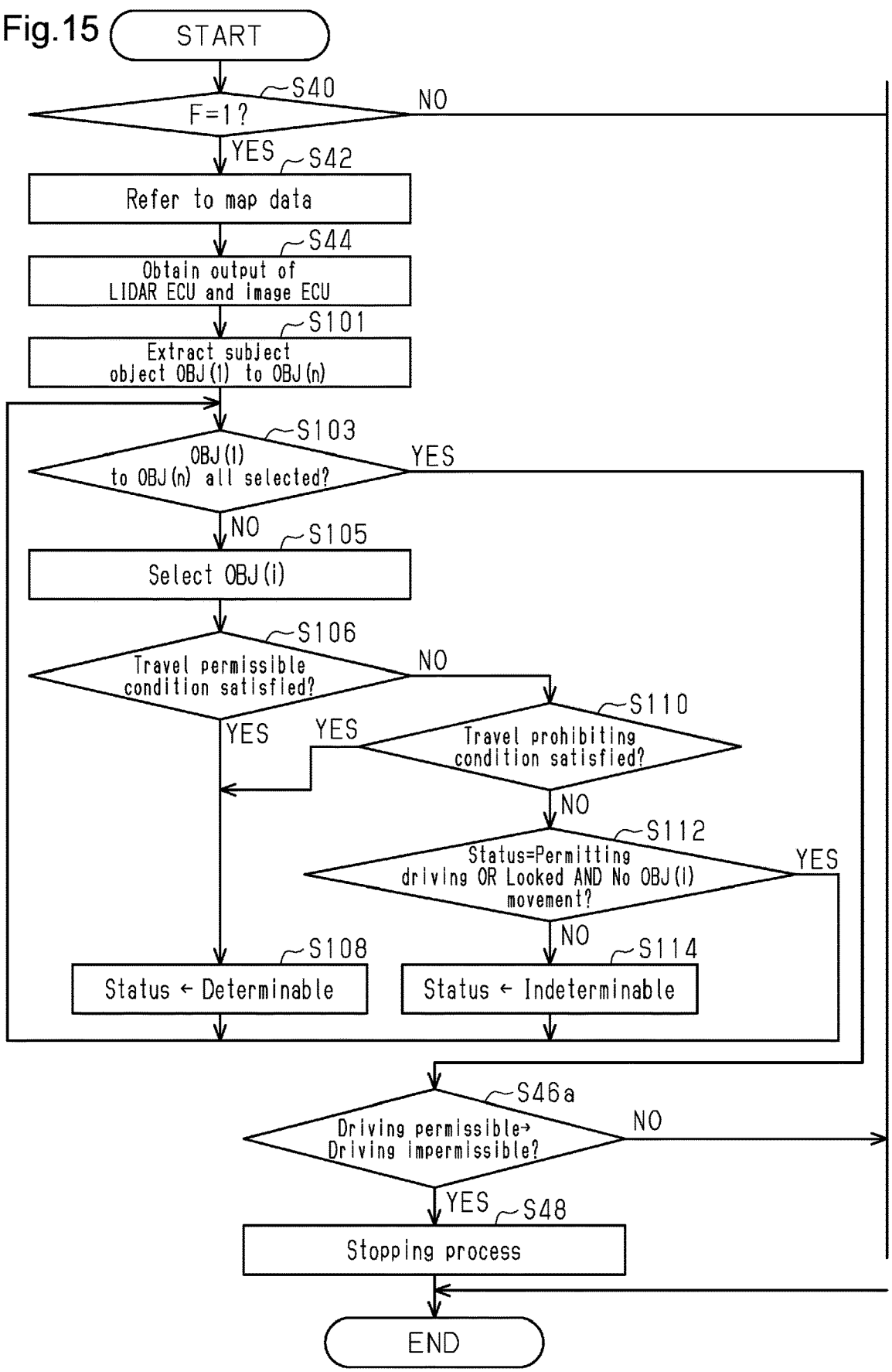
FIG. 15 is a flowchart illustrating a process based on a travel control program in accordance with the second embodiment.

FIG. 15 illustrates part of the autonomous driving process. The CPU 32 implements the process shown in FIG. 15 by, for example, repeatedly executing the travel control program (Pad) stored in the storage device 34 in predetermined cycles. In FIG. 15, the same step numbers are given to the processes that correspond to the steps shown in FIG. 4.

In the process shown in FIG. 15, when step S44 is completed, the CPU 32 extracts subject objects OBJ(1) to OBJ(n) based on the outputs of the LIDAR ECU 10 and updates the status list data Dl (S101). In other words, the CPU 32 designates the subject objects OBJ(1) to OBJ(n), which are extracted in step S101, as the subject objects OBJ of which the status is specified in the status list data Dl.

A subject object is checked when determining whether driving of the vehicle VC is permissible. The CPU 32 checks whether each of the subject objects OBJ(1) to OBJ(n) is causing driving of the vehicle VC to be impermissible. A subject object OBJ includes traffic indicators such as a traffic light. Further, a subject object OBJ includes an object located in any one of three regions, namely, the lane in which the vehicle VC is traveling, a lane next to the lane in which the vehicle VC is traveling, and a region near the lane in which the vehicle VC is traveling. There may be no subject object OBJ. Such a case is defined by "n=0".

Then, the CPU 32 determines whether the subject objects OBJ(1) to OBJ(n) extracted in step S101 have all been selected by the process in step S105, which will be described below (S103). The CPU 32 gives an affirmative determination when there is no subject object OBJ.

When the CPU 32 determines that there still is a subject object OBJ that has not been selected (S103: NO), the CPU 32 selects one subject object OBJ(i) from the subject objects OBJ(1) to OBJ(n), which are extracted in step S101 (S105). Next, the CPU 32 determines whether the subject object OBJ(i) satisfies the travel permissible condition (S106). For example, when the subject object OBJ(i) is moving away from the lane in which the vehicle VC is traveling, the CPU 32 determines that the travel permissible condition is satisfied. Further, even when the subject object OBJ(i) is moving toward the lane in which the vehicle VC is traveling, as long as the subject object OBJ(i) is separated from the vehicle VC by a predetermined distance or greater, the CPU 32 determines that the travel permissible condition is satisfied. When the CPU determines that the travel permissible condition has been satisfied (S106: YES), the CPU 32 sets the status of the subject object OBJ(i) specified in the status list data Dl to "determinable" (S108).

When the CPU 32 determines that the travel permissible condition is not satisfied (S106: NO), the CPU 32 determines whether the travel prohibiting condition specified by the travel prohibiting condition data Drf is satisfied (S110). Step S110 corresponds to a prohibition determination process. When the CPU 32 determines that the travel prohibiting condition has been satisfied (S110: YES), the CPU 32 proceeds to step S108. For example, when there is a vehicle stopped ahead in the lane in which the vehicle VC is traveling, it is preferred that the stopped vehicle be excluded from the travel prohibiting condition. This allows the driver to give an instruction to drive the vehicle in a process that will be described later under a situation such as the example shown in FIGS. 6A and 6B.

As described above, when the travel permissible condition or the travel prohibiting condition is satisfied, the CPU 32 designates the status of the object as "determinable" since the ADAS ECU 30 can independently determine whether autonomous driving of the vehicle is permissible.

When the CPU 32 determines that the travel prohibiting condition is not satisfied (S110: NO), the CPU 32 determines whether the logical conjunction of condition (A) and condition (B), which are described below, is true (S112).

Condition (A) is that the status of the subject object OBJ(i), which is determined in a process described later, is "permitting driving" or "looked."

Condition (B) is that the subject object OBJ(i) has not moved since when the process of FIG. 15 was last executed.

When the CPU 32 determines that the logical conjunction is false (S112: NO), the CPU 32 designates the status as "indeterminable" (S114).

The CPU 32 returns to step S103 when step S108 or S114 is completed. The CPU 32 also returns to step S103 when an affirmative determination is given in step S112.

When an affirmative determination is given in step S103, the CPU 32 determines whether the state has shifted from a state in which autonomous driving of the vehicle is permissible to a state in which autonomous driving of the vehicle is impermissible (S46a). Driving of the vehicle is permissible when the status of each subject object OBJ is "determinable" and the travel permissible condition is satisfied or the status of each subject object OBJ is "permitting driving." Driving of the vehicle is impermissible when there is at least one of a subject object OBJ of which the status is "determinable" and satisfies the travel prohibiting condition and a subject object OBJ of which the status is "indeterminable".

When the CPU 32 determines that the state has shifted to a state in which the driving of the vehicle is impermissible (S46a: YES), the CPU 32 proceeds to step S48.

The CPU 32 temporarily ends the process shown in FIG. 15 when the process of step S48 is completed. The CPU 32 also temporarily ends the process shown in FIG. 15 when a negative determination is given in step S40 or S46a.

"Process for Updating Status of Object based on Line of Sight of Driver"

Figure 16:
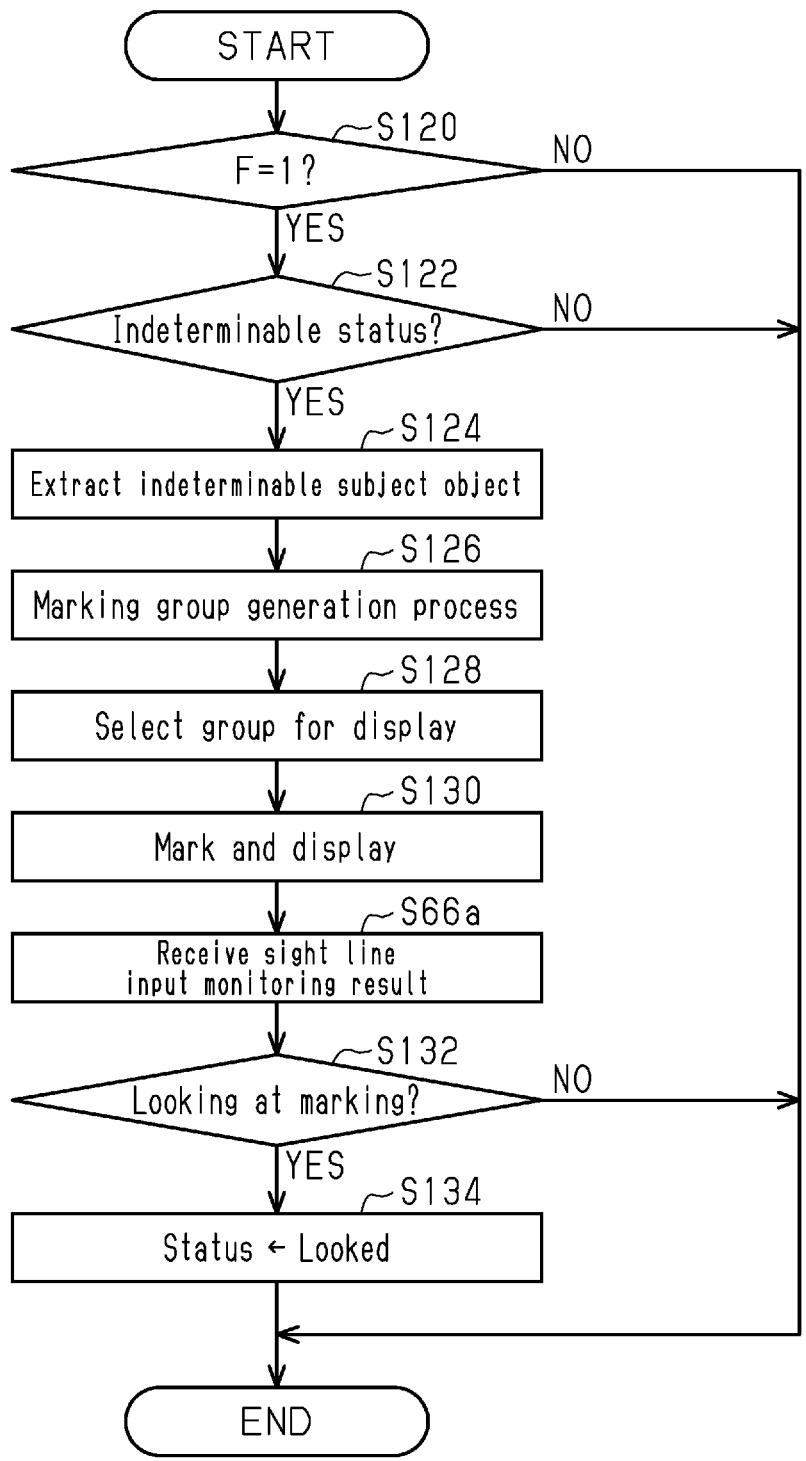
FIG. 16 is a flowchart illustrating a process based on the travel control program in accordance with the second embodiment.

FIG. 16 illustrates part of the autonomous driving process. The CPU 32 implements the process shown in FIG. 16 by, for example, repeatedly executing the travel control program (Pad) stored in the storage device 34 in predetermined cycles. Preferably, the cycle in which the process of FIG. 16 is executed is shorter than or equal to the cycle in which the process of FIG. 15 is executed.

In the process shown in FIG. 16, the CPU 32 first determines whether the autonomous driving mode flag F is "1" (S120). When determining that the autonomous driving mode flag F is "1" (S120: YES), the CPU 32 determines whether there is a subject object OBJ of which the status is "indeterminable" (S122). Steps S103, S105, S106 to S114, and S122 correspond to the travel permissible information obtaining process. When the CPU 32 determines that there is a subject object OBJ of which the status is "indeterminable" (S122: YES), the CPU 32 extracts the subject object OBJ (S124). Then, the CPU 32 generates marking groups marking groups of subject objects OBJ (S126). For example, when people are standing near a crosswalk, the CPU 32 groups the subject objects OBJ corresponding to the people at the crosswalk into a single marking group. A marking group may include only one subject object OBJ.

Next, the CPU 32 selects one of the marking groups generated in step S126 for display (S128). From the marking groups that have not yet been displayed, the CPU 32 selects the group that is closest to the vehicle VC (S130). Step S130 corresponds to the inquiring process. The CPU 32 then receives the monitoring result of an input based on the line of sight of the driver, which is in the vehicle interior image data Dii, from the DMS ECU 60 (S66a). Step S66a corresponds to the action recognizing process. The CPU 62 determines from the received monitoring result whether the line of sight of the driver is directed toward the marking (S132). In other words, the CPU 32 determines whether the driver is looking at the marking. When the CPU 32 determines that the driver is looking at the marking (S132: YES), the CPU 32 updates the status of every subject object OBJ belonging to the group to "looked" (S134). Steps S132 and S134 correspond to a detection history storing process.

The CPU 32 temporarily ends the process shown in FIG. 16 when step S134 is completed. The CPU 32 also temporarily ends the process shown in FIG. 16 when a negative determination is given in step S120, S122, or S132.

Figure 17:
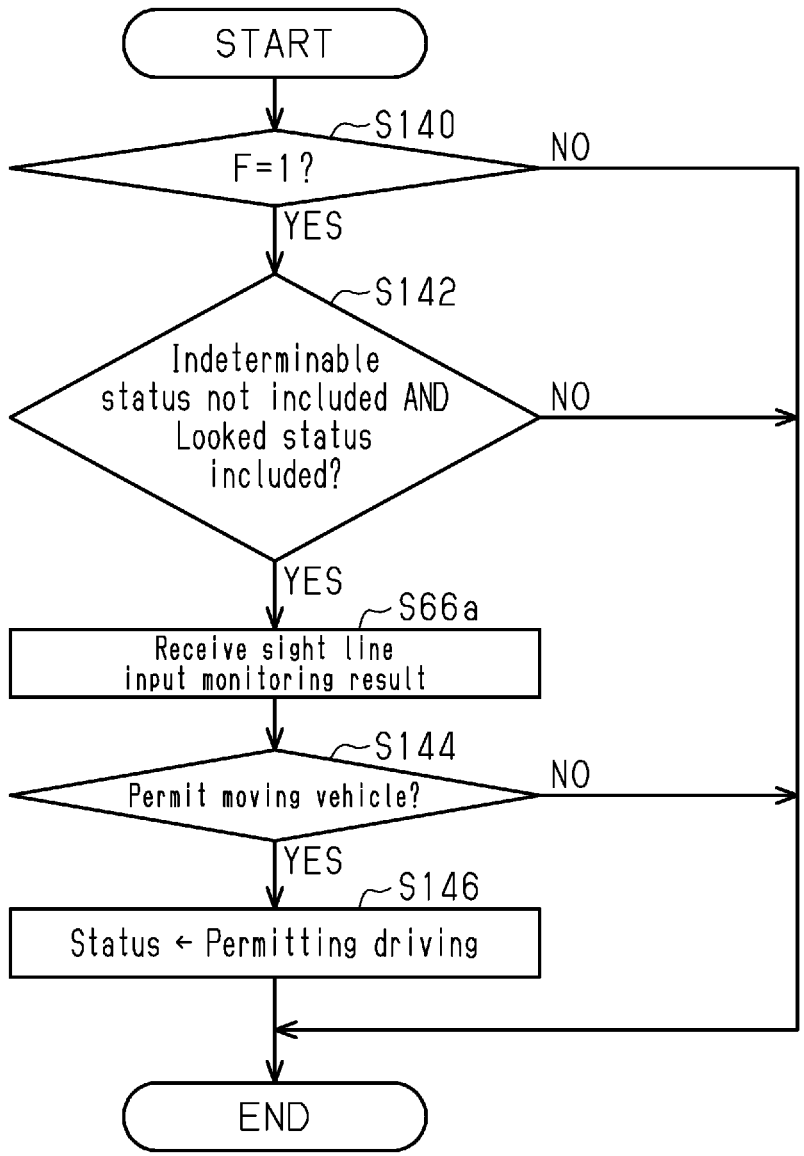
FIG. 17 is a flowchart illustrating a process based on the travel control program in accordance with the second embodiment.

FIG. 17 illustrates part of the autonomous driving process. The CPU 32 implements the process shown in FIG. 17 by, for example, repeatedly executing the travel control program (Pad) stored in the storage device 34 in predetermined cycles. Preferably, the cycle in which the process of FIG. 17 is executed is shorter than or equal to the cycle in which the process of FIG. 15 is executed.

In the process of FIG. 17, the CPU 32 first determines whether the autonomous driving mode flag F is "1" (S140). When determining that the autonomous driving mode flag F is "1" (S140: YES), the CPU 32 determines whether the logical conjunction of condition (C) and condition (D), which are described below, is true (S142).

Condition (C) is that the status specified in the status list data Dl does not include "indeterminable".

Condition (D) is that the status specified in the status list data Dl includes "looked".

When the CPU 32 determines that the logical conjunction is true (S142: YES), the CPU 32 receives the monitoring result of an input based on the line of sight of the driver, which is in the vehicle interior image data Dii, from the DMS ECU 60 (S66a). Then, the CPU 62 determines from the received monitoring result whether the line of sight of the driver is directed toward a lane in which the vehicle can travel (S144). In other words, the CPU 32 determines whether the driver is giving an instruction to drive the vehicle VC. When determining that the driver is giving an instruction to drive the vehicle (S144: YES), the CPU 32 updates the status list data Dl from status "looked" to "permitting driving" (S146). Steps S132, S134, and S142 to S146 correspond to the determination process. Steps S142 to S146 correspond to a travel permission determination process.

The CPU 32 temporarily ends the process shown in FIG. 17 when step S146 is completed. The CPU 32 also temporarily ends the process shown in FIG. 17 when a negative determination is given in step S140, S142, or S144.

"Process Related to Resuming Autonomous Driving"

Figure 18:
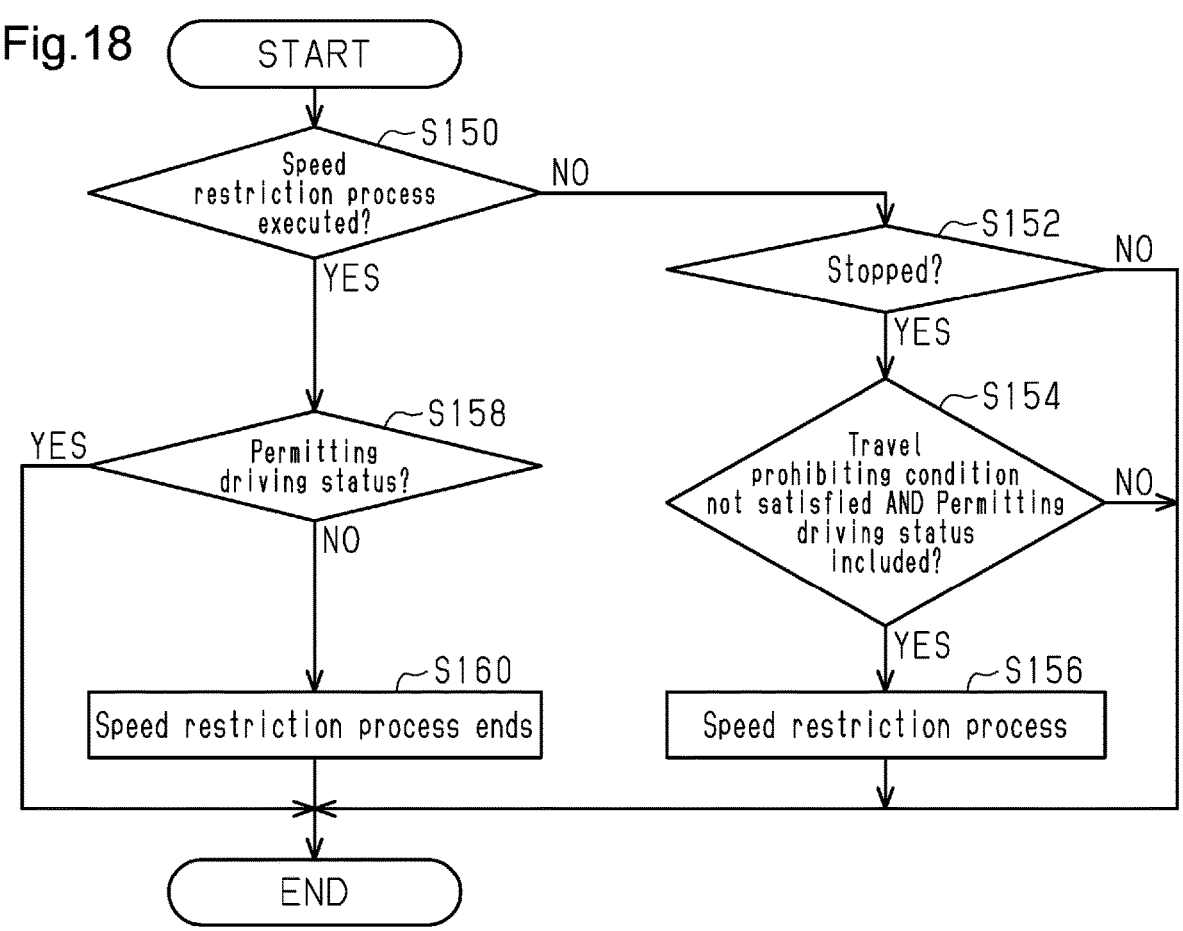
FIG. 18 is a flowchart illustrating a process based on the travel control program in accordance with the second embodiment.

FIG. 18 illustrates part of the autonomous driving process. The CPU 32 implements the process shown in FIG. 18 by, for example, repeatedly executing the travel control program (Pad) stored in the storage device 34 in predetermined cycles. Preferably, the process of FIG. 18 is executed in the same cycle in which the process of FIG. 15 is executed.

In the process of FIG. 18, the CPU 32 first determines whether a speed restriction process is being executed (S150). When the CPU 32 determines that the speed restriction process is not being executed (S150: NO), the CPU 32 determines whether the vehicle is in a stopped state as a result of step S48 (S152). When the CPU 32 determines that the vehicle is in a stopped state (S152: YES), the CPU 32 determines whether the logical conjunction of condition (E) and condition (F), which are described below, is true (S154).

Condition (E) is that the travel prohibiting condition is not satisfied. More specifically, when the status is "determinable," condition (E) is that the status is a result of the affirmative determination in step in S106.

Condition (F) is that the status specified in the status list data Dl includes "permitting driving".

When the CPU 32 determines that the logical conjunction is true (S154: YES), the CPU 32 executes the speed restriction process (S156). The speed restriction process is a process for restricting the vehicle speed to lower than or equal to an upper speed limit Lspd. When distance L is relatively long between the vehicle and the subject object OBJ of which the status is "permitting driving," the CPU 32 sets the upper speed limit Lspd to a value greater than when the distance L is relatively short.

Figure 19:
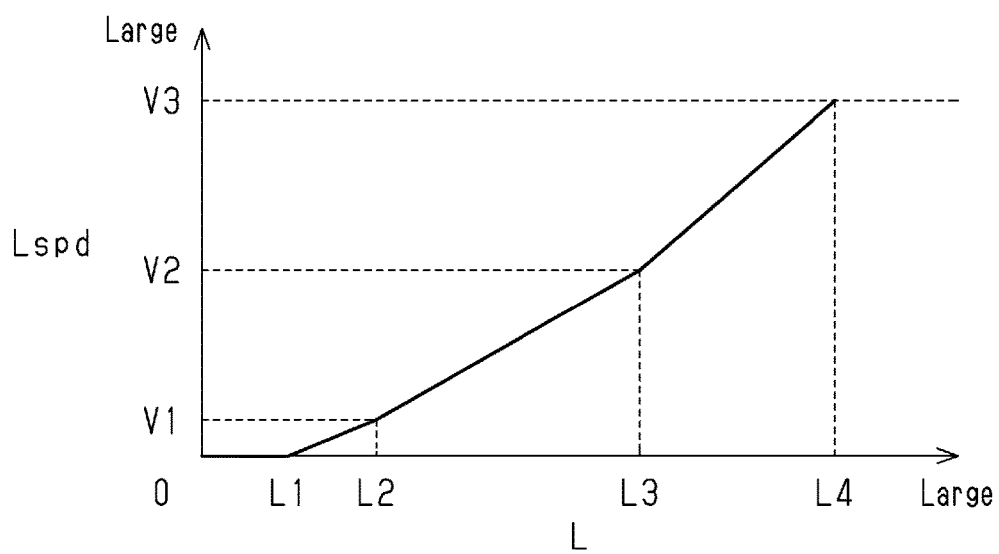
FIG. 19 is a diagram showing the relationship between the distance and the upper speed limit in accordance with the second embodiment.

FIG. 19 shows an example of the relationship between the distance L and the upper speed limit Lspd. In FIG. 19, when the distance L is less than or equal to a first distance L1, the upper speed limit Lspd is set to 0, and when the distance L is greater than the first distance L1 and less than or equal to a second distance L2, the upper speed limit Lspd is set to a first limit V1. Preferably, the first distance L1 is greater than or equal to 1 m and less than or equal to 1.5 m. Also, for example, the second distance L2 may be approximately 1.5 to 2.5 m, and the first limit V1 may be 1 to 1.5 km/h. When the upper speed limit Lspd is greater than 0, the vehicle VC starts moving.

As shown in FIG. 18, when the CPU 32 determines that the speed restriction process is being executed (S150: YES), the CPU 32 determines whether the status specified in the status list data Dl includes "permitting driving" (S158). When determining that the status of "permitting driving" is not included (S158: NO), the CPU 32 ends the speed restriction process (S160). Steps S154 to S160 correspond to the autonomous driving permitting process.

The CPU 32 temporarily ends the process shown in FIG. 18 when step S156 or S160 is completed. The CPU 32 also temporarily ends the process shown in FIG. 18 when a negative determination is given in step S152, S154, or S158.

The operation and advantages of the present embodiment will now be described.

In the example shown in FIG. 20A, there is a crosswalk in front of the vehicle VC in the traveling lane and four people are standing near the crosswalk. In the situation of FIG. 20A, the CPU 32 designates the four people near the crosswalk as subject objects OBJ(1) to OBJ(4), respectively. Also, the CPU 32 designates the two people located relatively far from the traveling lane as subject objects OBJ(5) and OBJ(6).

As shown in FIG. 20B, the CPU 32 writes the status of each of the subject objects OBJ(1) to OBJ(6) to the status list data Dl. Specifically, the CPU 32 sets the status of the subject objects OBJ(1) to OBJ(4) to "indeterminable" and the status of the subject objects OBJ(5) and OBJ(6) to "determinable". The subject objects OBJ(5) and OBJ(6) satisfy the travel permissible condition and thus the status is set to "determinable".

As shown in FIG. 20C, the CPU 32 groups the subject objects OBJ(1) to OBJ(4) into a single marking group and displays a marking MK indicating the group. Then, the CPU 32 monitors the line of sight of the driver. When determining that the line of sight is directed toward the marking MK, or that the driver is looking at the marking MK, the CPU 32 updates the status of the subject objects OBJ(1) to OBJ(4) to "looked" as shown in FIG. 20D.

In the state shown in FIG. 20D, the CPU 32 monitors whether the driver gives an instruction to drive the vehicle based on the line of sight of the driver. In this state, the status specified in the status list data Dl does not include "indeterminable". Also, the status "determinable" refers to a state in which it is determined that driving of the vehicle has been permitted with respect to the corresponding object. Thus, the CPU 32 monitors whether the driver gives an instruction to drive the vehicle VC and autonomously drives the vehicle VC upon an instruction from the driver. When the driver gives an instruction to drive the vehicle, the CPU 32 starts moving the vehicle VC while executing the speed restriction process. The CPU 32 continues the vehicle speed restriction process while the status is "permitting driving".

Figure 21:
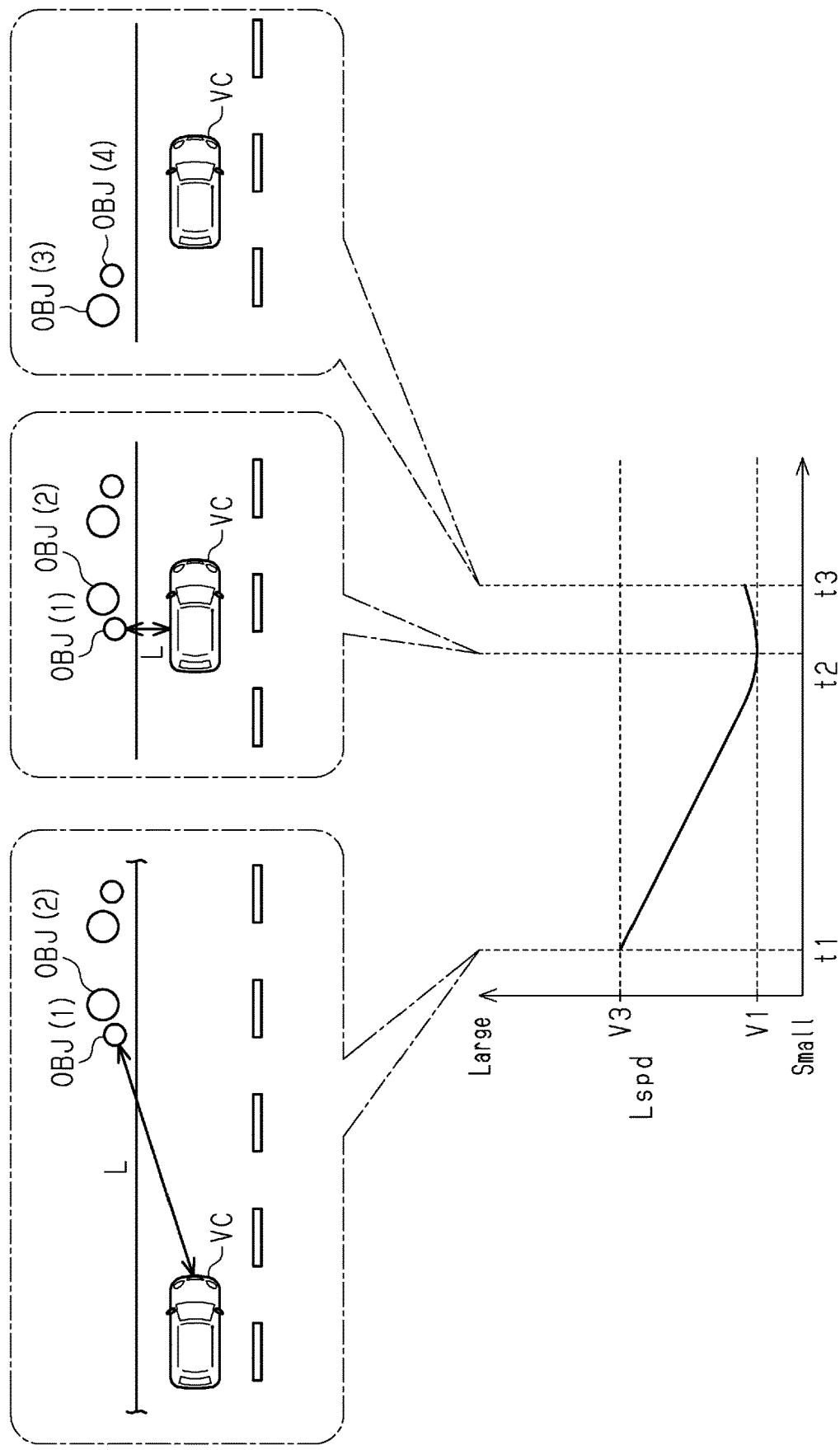
FIG. 21 is a diagram showing the operation of the second embodiment.

FIG. 21 shows an example in which the vehicle speed restriction process changes the upper speed limit Lspd.

At time t1 indicated in FIG. 21, as the vehicle VC starts moving when the distance L is relatively great between the vehicle VC and the subject objects OBJ(1) to OBJ(4), the distance L between the vehicle VC and the subject objects OBJ(1) to OBJ(4) gradually decreases. Accordingly, the CPU 32 gradually decreases the upper speed limit Lspd. The upper speed limit Lspd becomes smallest at time t2 when the distance L between the vehicle VC and the subject objects OBJ(1) to OBJ(4) is smallest. Then, at time t3, when the subject objects OBJ(1) to OBJ(4) are behind the vehicle VC, the CPU 32 determines that the travel permissible condition has been satisfied in step S106. The CPU 32 then changes the status of the subject objects OBJ(1) to OBJ(4) to "determinable". This cancels the speed restriction process and shifts to normal autonomous driving.

In accordance with the present embodiment, the CPU 32 determines whether the driver is giving an instruction to drive the vehicle after confirming that the driver is looking at the subject object OBJ in the marking MK. Thus, when the CPU 32 cannot determine by itself whether the driving of the vehicle is permissible, the CPU 32 determines whether the driver has recognized the subject object OBJ and is giving an instruction to drive the vehicle.

The present embodiment described above further has the following operation and advantages.

(7) When the travel prohibiting condition is satisfied, the CPU 32 sets the status of the object to "determinable". Thus, the CPU 32 does not have to mark the subject object OBJ when it can be determined, without requesting the driver for an instruction, that driving of the vehicle is impermissible. This will reduce the tasks performed by the driver.

(8) The CPU 32 generates marking groups and shows the marking MK surrounding each group. Thus, the driver can find the marking MK more easily than when every object is indicated with a marking MK.

(9) When there are a number of marking groups, the CPU 32 sequentially shows each group with a marking MK. This allows the driver to know which subject requires caution.

Other Embodiments

The present embodiment may be modified as follows. The above-described embodiment and the following modifications can be combined as long as the combined modifications remain technically consistent with each other.

Action Recognizing Process

An action of the driver that is recognized in response to the inquiring process is not limited to eye movement, or line of sight. For example, the action can be a pointing action performed with a finger or the like.

Determination Process on Whether Autonomous Driving of Vehicle is Permissible

In the first embodiment, when the travel permissible condition defined by the travel permissible condition data Drp is not satisfied, it is determined that autonomous driving of the vehicle is impermissible. However, there is no limitation to such a configuration. For example, a condition in which autonomous driving of the vehicle is impermissible may be defined. If the condition is satisfied, it may be determined that autonomous driving of the vehicle is impermissible.

Travel Permissible Information Obtaining Process

In the first embodiment, if the vehicle is stopped for a certain time in the autonomous driving mode, the inquiring process is initiated when information indicating that autonomous driving of the vehicle is permissible cannot be obtained. However, there is no limit to such a configuration. For example, data defining a condition for prohibiting autonomous driving of the vehicle regardless of an instruction from the driver to drive the vehicle may be stored in the storage device 34. In this case, if the vehicle is stopped for a certain time in the autonomous driving mode and the cause of the affirmative determination in step S46 does not satisfy the condition, it may be determined that the information that initiates the inquiring process has been obtained. In this case, driving of the vehicle can be resumed quickly. The condition is, for example, that a traffic light is red at an intersection.

Information indicating determination of whether autonomous driving of the vehicle is permissible cannot be given does not necessarily have to include information indicating that the vehicle is stopped for a certain time in the autonomous driving mode. For example, the travel permissible information obtaining process, which obtains information indicating that determination of whether autonomous driving of the vehicle is permissible cannot be given, may be executed in step S46.

Prohibition Determination Process

In the second embodiment, a determination is given as to whether the travel prohibiting condition is satisfied. However, this may be omitted. In this case, the status of each subject object OBJ that does not satisfy the travel permissible condition may be designated as "indeterminable".

Status

In the second embodiment, the status of "determinable" is designated when the travel permissible condition is satisfied and when the travel prohibiting condition is satisfied. However, there is no limitation to such a configuration. For example, different statuses such as "driving permissible" and "driving prohibited" may be set, respectively.

Inquiring Process

In the first embodiment, the inquiring process is executed whenever the vehicle is stopped for a certain time in the autonomous driving mode. However, there is no limitation to such a configuration. For example, data defining a condition for prohibiting autonomous driving of the vehicle regardless of an instruction from the driver to drive the vehicle may be stored in the storage device 34. If this condition is satisfied, the inquiring process will not be executed even when a certain time elapses. The condition is, for example, that a traffic light is red at an intersection.

In the second embodiment, the marking is shown when the status of an object is "indeterminable". However, if the status of an object is "indeterminable" because the travel prohibiting condition is satisfied, the marking does not have to be shown. In this case, for example, a determination is added to step S122 as to whether the travel prohibiting condition is satisfied.

Figure 22:
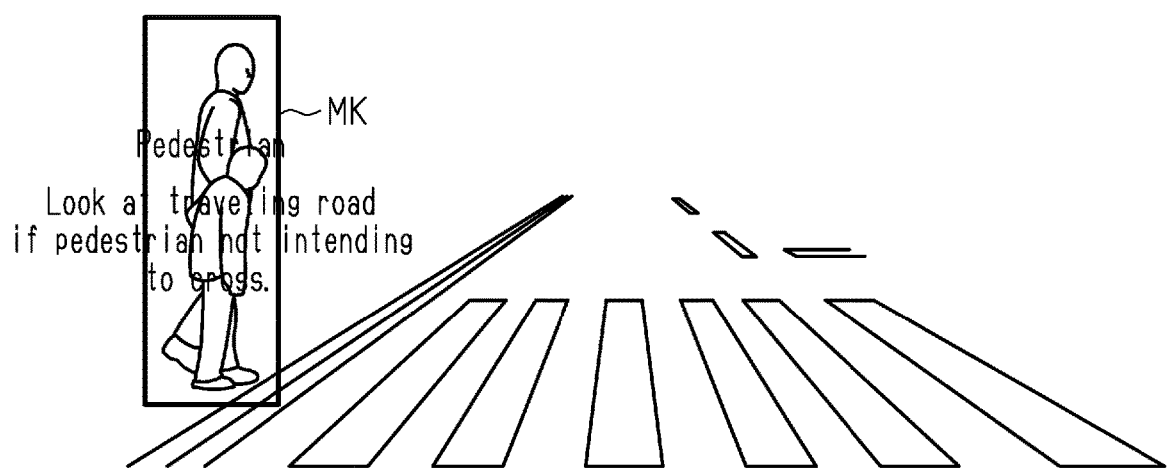
FIG. 22 is a diagram showing a modified example of the above embodiments.

The inquiring process does not have to mark an object that resulted in execution of the stopping process on the HUD 48. For example, in addition to surrounding an object with a marking, a message may be displayed as shown in the example of FIG. 22. In FIG. 22, the displayed information indicates the action required by the driver to instruct the vehicle to travel. This allows the driver to understand the required action. For example, an in-vehicle speaker may be operated to issue a voice inquiry together with the marking process. Alternatively, for example, only a voice inquiry may be generated since the marking process using the HUD 48 is not essential.

Stopping Process

In the first embodiment, when an affirmative determination is given in step S46, the stopping process is executed. However, there is no limitation to such a configuration. For example, when an affirmative determination is given in step S46, the speed of the vehicle may be reduced and the process in S64 may be immediately performed. Then, if the driver instructs the vehicle to travel, the stopping process does not have to be executed. Alternatively, for example, when an affirmative determination is given in step S46, the process in S64 may be immediately performed without reducing the speed of the vehicle. Then, if the driver instructs the vehicle to travel, the stopping process does not have to be executed.

In the second embodiment, when an affirmative determination is given in step S46a, the stopping process is executed. However, there is no limitation to such a configuration. For example, when driving of the vehicle is impermissible because the status is "indeterminable," as long as an instruction of the driver to drive the vehicle can be promptly obtained, the stopping process does not have to be executed. Such a situation is exemplified in FIGS. 23A to 23E.

In the example of FIG. 23A, the people near a crosswalk are indicated as subject objects OBJ(1) and OBJ(2) and grouped together in a marking MK. FIG. 23B shows the status list data Dl. In this example, subject object OBJ(3) is relatively far from the vehicle VC and satisfies the travel permissible condition. When the driver looks at the subject objects OBJ(1) and OBJ(2) in the marking MK, the status will be changed as shown in FIG. 23C. Then, when the driver looks at the front of the vehicle, the status will be changed again and the vehicle will start moving.

FIG. 23D shows an example of the status list data Dl immediately after the vehicle starts moving. In FIG. 23D, the status of the subject object OBJ(3) is changed to "indeterminable" because the moving vehicle VC has become closer to the subject object OBJ(3). In this case, as shown in FIG. 23E, the subject object OBJ(3) is shown in a marking MK but the stopping process of the vehicle VC is not executed. If the status of the subject object OBJ(3) is changed to "permitting driving" before the vehicle VC reaches the intersection, the vehicle VC can keep moving without stopping.

In FIG. 23B, the status of the subject object OBJ(3) is "determinable". However, there is no limitation to such a configuration. For example, if the distance between the vehicle VC and the subject object OBJ(3) is greater than or equal to a predetermined value and an instruction to drive the vehicle is given with respect to the subject objects OBJ(1) and OBJ(2), the vehicle VC can be driven even if the status of the subject object OBJ(3) in the status list data Dl is "indeterminable". In this case, condition (C) is deleted from step S142.

Determination Process

The determination process does not have to be executed based on whether the driver directs his or her line of sight toward a lane in which the vehicle can travel. For example, when the action recognizing process is a process for recognizing a pointing action performed with a finger as described under "Action Recognizing Process", the determination process may be performed based on whether the driver points a finger toward a lane in which the vehicle can travel.

Autonomous Driving Permitting Process

In the first embodiment, when the driver instructs driving of the vehicle in response to the inquiring process, autonomous driving of the vehicle is resumed. However, there is no limitation to such a configuration. For example, data defining a condition for prohibiting autonomous driving of the vehicle regardless of an instruction from the driver to drive the vehicle may be stored in the storage device 34. Then, if this condition is satisfied, the vehicle may be kept stopped. The condition is, for example, that a traffic light is red at an intersection.

In a case where the stopping process is not executed as described under "stopping process", the autonomous driving permitting process may be for maintaining autonomous driving of the vehicle without stopping the vehicle when the driver instructs the vehicle to travel. For example, the vehicle may be driven slowly while maintaining autonomous driving in a situation in which step S74 is performed in the first embodiment, and the vehicle may be driven normally while maintaining autonomous driving in a situation in which step S72 is performed in the above embodiment.

Slow Driving Mode

In the first embodiment, FIGS. 9 and 12 show examples of the slow driving process that corresponds to the autonomous driving permitting process in the slow driving mode. However, these are merely examples. For example, the slow driving process may be executed when a vehicle is stopped ahead in part of the same lane as the traveling vehicle. In general, it is difficult to specifically generate every feasible logic for each individual case in advance for a negative determination given in step S68 that results in the execution of the slow driving process. Thus, complex logics can be effectively avoided by setting a logic that starts moving the vehicle slowly when a negative determination is given in step S68 and the driver permits driving of the vehicle with his or her line of sight. In this case, the vehicle may be shifted to normal driving if the cause stopping the vehicle is resolved and the condition defined by the travel permissible condition data Drp shown in FIG. 1 is satisfied. When an event that does not satisfy the condition defined by the travel permissible condition data Drp occurs and the event differs from the cause stopping the vehicle, the vehicle may be stopped again.

The normal starting definition data Ddn is not essential. For example, data defining a case where the vehicle is shifted to slow driving may be included. In this case, step S72 is executed when the situation corresponds to the definition. Alternatively, for example, the slow driving process may be executed unconditionally when the vehicle starts moving after stopping.

Speed Restriction Process

Figure 24:
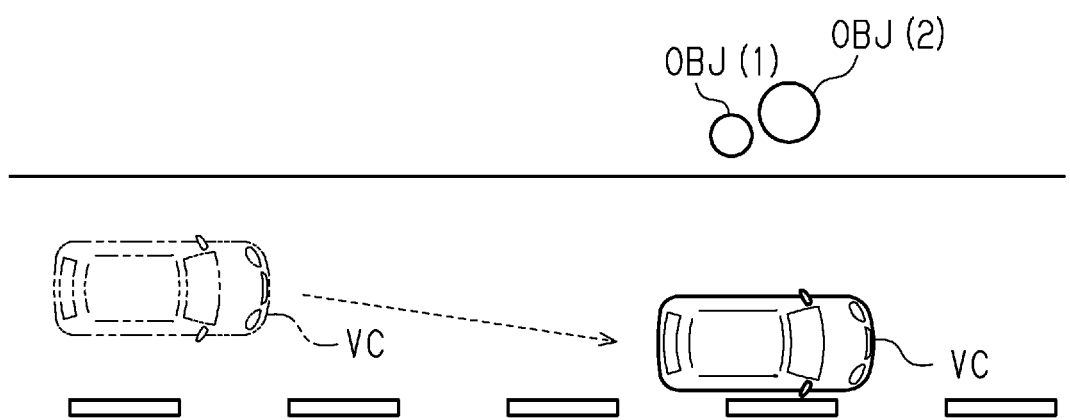
FIG. 24 is a diagram showing a modified example of the second embodiment.

In the example shown in FIG. 21, the vehicle VC is driven straight when the speed restriction process is executed. However, there is no limitation to such a configuration. For example, as shown in FIG. 24, the vehicle VC can be driven so as to increase the distance between the vehicle and the subject object OBJ of which the status is "permitting driving". In the example of FIG. 24, the vehicle VC moves toward the right of the lane to increase the distance L between the vehicle VC and the subject objects OBJ(1) and OBJ(2), which are at the left side of the vehicle VC.

Display on Display Device

In the second embodiment, steps S81 and S84 are not performed in the situation shown in FIGS. 20A to 20D, but these steps may be included.

Prompting Process

In the above embodiment, the speaker 49 serves as a warning device and is operated to prompt the driver to be cautious. However, there is no limitation to such a configuration. For example, when a condition for executing the autonomous driving process includes that the hand of the driver is placed on the steering wheel, a warning device may be used to vibrate the steering wheel and prompt the driver to be cautious.

Subject of Determination of Whether Autonomous Driving of Vehicle is Permissible In the above embodiment, the ADAS ECU 30 serves as a travel controller and determines whether autonomous driving of the vehicle is permissible. However, there is no limitation to such a configuration. For example, the travel permissible condition data Drp may be stored in a storage device located outside and away from the vehicle, and a computer located outside and away from the vehicle may determine whether autonomous driving of the vehicle is permissible. The computer, which is not installed in the vehicle, may transmit the determination result via a global network that allows for communication between the computer and the vehicle. In this case, the processes in S46 and S46a are performed when the determination result is received.

In this example, the data transmitted from the vehicle may include the recognition result of objects by the LIDAR ECU 10, the recognition result of objects by the image ECU 20, and the position data Dgps. In addition, the vehicle may also transmit the distance measurement point data group Drpc, the vehicle exterior image data Dio, and the position data Dgp. In this case, the processes executed by the LIDAR ECU 10 and the image ECU 20 in the above embodiment are performed by the computer, which is not included in the vehicle.

The computer that is not installed in the vehicle is, for example, a device that processes data received from a number of vehicles. Alternatively, the computer not included in the vehicle may be a portable terminal carried by the driver.

Travel Controller

In the above embodiment, the ADAS ECU 30 serves as a travel controller and receives the recognition result of an object obtained by the LIDAR ECU 10, which performs a clustering process and the like on the distance measurement point data group Drpc. However, there is no limitation to such a configuration. For example, the ADAS ECU 30 may receive the distance measurement point data group Drpc from the photosensor 12 and perform a recognition process of objects using the distance measurement point data group Drpc. In other words, the ADAS ECU 30 may perform the process executed by the LIDAR ECU 10 in the above embodiment.

In the above embodiment, the ADAS ECU 30 serves as a travel controller and receives the recognition result of an object obtained by the image ECU 20, which performs an image recognition process and the like on the vehicle exterior image data Dio. However, there is no limitation to such a configuration. For example, the ADAS ECU 30 may receive the vehicle exterior image data Dio from the vehicle exterior camera 22 and use the image data to perform an object recognition process. In other words, the ADAS ECU 30 may perform the process executed by the image ECU 20 in the above embodiment.

In the first embodiment, the ADAS ECU 30 serves as a travel controller and executes the travel control program (Pad) and the DMS program Pdms. However, there is no limitation to such a configuration. For example, a device separate from the ADAS ECU 30 may execute the DMS program Pdms as in the second embodiment. In this case, in response to the inquiring process, the ADAS ECU 30 receives an input based on the line of sight of the driver from the separate device. Alternatively, for example, the ADAS ECU 30 may analyze the vehicle interior image data Dii output from the vehicle interior camera 46 to monitor inputs based on the line of sight.

Even when the DMS ECU 60 is separate from the ADAS ECU 30, for example, the ADAS ECU 30 may analyze the vehicle interior image data Dii output from the vehicle interior camera 46 and monitor an input based on the line of sight of the driver. The vehicle interior camera 46 for the DMS ECU 60 can also be used to monitor the line of sight of the driver for an instruction to drive the vehicle.

In the second embodiment, the DMS ECU 60 is separated from the ADAS ECU 30. However, there is no limitation to such a configuration. For example, the ADAS ECU 30 may be integrated with the DMS ECU 60 as in the first embodiment.

In FIG. 2, steps S10 and S12 are implemented when the CPU 32 executes the travel control program (Pad). However, there is no limitation to such a configuration. For example, a navigation system separate from the ADAS ECU 30 may be performed to implement steps S10 and S12.

The travel controller is not limited to a device that executes software processing and includes the CPU 32 and the storage device 34. For example, the travel controller may include a dedicated hardware circuit such as an application specific integrated circuit (ASIC) that executes at least part of the software processing executed in the above embodiment. That is, the executing device may be modified as long as it has any one of the following configurations (a) to (c). (a) A configuration including a processor that executes all of the above-described processes according to programs and a program storage device that stores the programs. (b) A configuration including a processor and a program storage device that execute part of the above-described processes according to the programs and a dedicated hardware circuit that executes the remaining processes. (c) A configuration including a dedicated hardware circuit that executes all of the above-described processes. There may be more than one software execution device and more than one dedicated hardware circuit including a processor and a program storage device.

Computer

A computer is not limited to the computer installed in the vehicle such as the CPU 32 shown in FIG. 1. For example, steps S64, S66, and S72 of FIG. 5 may be executed by the computer arranged in the vehicle, and steps S62, S68, S70, and the like may be executed by a computer that is not arranged in the vehicle. In this case, the computer arranged in the vehicle and the computer not arranged in the vehicle may communicate with each other to execute the process shown in FIG. 5 in cooperation. Specifically, for example, when a computer not arranged in the vehicle provides an affirmative determination in step S70, the computer informs the computer arranged in the vehicle of the affirmative determination and the computer arranged in the vehicle executes step S72.

Recognition Process of Object Outside Vehicle

In the example of the above embodiment, an object is recognized using the distance measurement point data group Drpc output from the photosensor 12 and the vehicle exterior image data Dio output from the vehicle exterior camera 22. However, there is no limitation to such a configuration. For example, distance measurement data such as millimeter waves output from a radar device may also be used. Alternatively, an object may be recognized using the distance measurement point data group Drpc and the distance measurement data of a radar device without using the vehicle exterior image data Dio. Further alternatively, an object may be recognized using the vehicle exterior image data Dio and the distance measurement data of a radar device without using the distance measurement point data group Drpc. The recognition process does not have to be performed using at least two of the three types of data, namely, the distance measurement point data group Drpc, the vehicle exterior image data Dio, and the distance measurement data of a radar device. The recognition process the may be performed using at least two of four types of data including, for example, reflection waves of ultrasonic waves and the above-mentioned three types of data. The object recognition does not necessarily have to use detection values of multiple sensors, or sensor fusion.

Vehicle Interior Camera

In the above embodiments, the vehicle interior camera 46 may be, for example, a visible light camera or an infrared light camera.

When a visible light camera is used, the line of sight may be calculated by a model-based method in which facial or eye models are fitted on an input image to estimate the line of sight. In this case, for example, the vehicle interior image data Dii is obtained as an input and a storage device stores in advance mapping data that specifies a map used for outputting a facial characteristic amount. In this case, the CPU 32 inputs the vehicle interior image data Dii to the map to calculate a facial characteristic amount. A facial characteristic amount corresponds to coordinate elements of predetermined characteristic points on a face in an image. Characteristic points on a face include the position of eyes and other points useful for calculating the orientation of the head. The map may be, for example, a convolutional neural network (CNN). Alternatively, a decision tree, support-vector regression, and the like may be used. The CPU 32 estimates the orientation of the head from the coordinates of each characteristic point, which is the facial characteristic amount, using a three-dimensional face model to determine the position of the head and the direction of the face. Further, the CPU 32 estimates the center of the eyeball based on the orientation of the head and the coordinates of predetermined facial characteristic points. Then, the CPU 32 estimates the center position of the iris based on the center of the eyeball and a model of an eyeball. The CPU 32 calculates a direction that extends from the center of the eyeball through the center of the iris as a direction in which the line of sight extends.

Alternatively, the mapping data may specify, for example, a map used for outputting the orientation of the head and the center position of an eyeball based on an input of the vehicle interior image data Dii. Further, the mapping data may specify, for example, a map used for outputting the center position of the iris and the center position of an eyeball based on an input of the vehicle interior image data Dii.

The model used in the model-based method is not limited to the sightline direction extending from the center of the eyeball through the center of the iris. For example, an eyeball model including the form of an eyelid may be used.

The sightline direction may be estimated through a method other than the model-based method. For example, the sightline direction may be estimated through an appearance-based method, with which a pre-learned model outputs a point of gaze based on an input of the vehicle interior image data Dii. The pre-learned model may be, for example, a linear regression model, a Gaussian process regression model, CNN, or the like.

When using an infrared light camera, the line of sight may be estimated based on the center position of the pupil and a reflection point of the infrared light on the cornea, which is determined from the reflection light.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

The invention claimed is:

1. A travel controller, comprising:
   circuitry configured to execute:
   an action recognizing process for recognizing an action of a driver of a vehicle from image data of the driver;
   a travel permissible information obtaining process for obtaining information indicating that a determination of whether autonomous driving of the vehicle is permissible cannot be given;
   an inquiring process for operating a human interface to request the driver for an instruction to drive the vehicle when the information indicating that the determination of whether autonomous driving of the vehicle is permissible cannot be given is obtained;
   a determination process for determining whether the driver is giving an instruction to drive the vehicle from an action recognized in the action recognizing process taken in response to the inquiring process; and, an autonomous driving permitting process for permitting autonomous driving of the vehicle by operating a drive system of the vehicle when determined in the determination process that the driver is giving an instruction to drive the vehicle, wherein the human interface is a heads-up display, the inquiring process includes a process for displaying graphics on the heads-up display to indicate an object that is obstructing determination of whether autonomous driving of the vehicle is permissible, the action recognizing process includes a process for recognizing a line of sight of the driver, the determination process includes a process for determining that the driver is giving an instruction to drive the vehicle when the line of sight is directed away from the graphics and toward a lane in which the vehicle can travel, and the determination process includes:

a detection history storing process for storing information indicating that the line of sight is directed toward the graphics when it is detected that the line of sight is directed toward the graphics in response to the inquiring process; and a travel permission determination process for determining that the driver is giving an instruction to drive the vehicle when it is detected that the line of sight is being directed away from the graphics toward a lane in which the vehicle can travel under a condition in which the information indicating that the line of sight is directed toward the graphics is stored.

2. The travel controller according to claim 1, wherein the travel permissible information obtaining process includes a prohibition determination process for determining whether a condition in which autonomous driving of the vehicle is impermissible is satisfied, and the travel permissible information obtaining process is a process for requesting the driver for an instruction to drive the vehicle when determined that the condition in which autonomous driving of the vehicle is impermissible is not satisfied in the prohibition determination process.

3. The travel controller according to claim 1, wherein the autonomous driving permitting process includes a process for operating the drive system in a normal driving mode and a process of operating the drive system in a slow driving mode, and the slow driving mode is selected under a condition where it is determined that the driver is giving an instruction to drive the vehicle in the determination process, and the slow driving mode is maintained, independently from the determination of the determination process, until the state in which determination of whether autonomous driving of the vehicle is permissible cannot be given is resolved.

4. The travel controller according to claim 1, wherein the autonomous driving permitting process includes a speed restriction process for operating the drive system to autonomously drive the vehicle while limiting vehicle speed until the state in which determination of whether autonomous driving of the vehicle is permissible cannot be given is resolved, independently from the determination of the determination process, and the speed restriction process is for limiting a traveling speed of the vehicle to a lower value when a distance is relatively short between the vehicle and an object that is obstructing determination of whether autonomous driving of the vehicle is permissible.

5. The travel controller according to claim 1, wherein the inquiring process includes the process for requesting the driver for an instruction to drive the vehicle when there is a person near a crosswalk where there is no traffic light in front of the vehicle with respect to a traveling direction of the vehicle.

6. The travel controller according to claim 5, wherein the vehicle includes a display device visually recognizable from outside the vehicle, and if the vehicle is stopped when there is a person near a crosswalk where there is no traffic light in front of the vehicle with respect to the traveling direction of the vehicle and the information indicating that determination of whether autonomous driving of the vehicle is permissible cannot be given is obtained, the circuitry is configured to further execute a process for showing information on the display device indicating that the vehicle is waiting for the person to cross the crosswalk.

7. The travel controller according to claim 5, wherein the vehicle includes a display device visually recognizable from outside the vehicle, and if the driver is giving an instruction to drive the vehicle in a situation in which there is a person near a crosswalk where there is no traffic light in front of the vehicle with respect to the traveling direction of the vehicle, the circuitry is configured to further execute a process for showing information on the display device to prompt the person to be aware that the vehicle is moving.

8. The travel controller according to claim 1, wherein the inquiring process includes the process for requesting the driver for an instruction to drive the vehicle when an object is obstructing a field of view of the driver at an intersection in front of the vehicle such that the driver cannot check a lane that intersects a lane in which the vehicle is traveling.

9. The travel controller according to claim 1, wherein the inquiring process includes the process for requesting the driver for an instruction to drive the vehicle when there is an object in front of the vehicle in a lane in which the vehicle is traveling, and the determination process includes the process for determining that the driver is giving an instruction to drive the vehicle when there is a number of lanes in a direction in which the vehicle is traveling and the driver performs an action instructing the vehicle to change lanes to a lane next to the lane in which the vehicle is traveling.

10. The travel controller according to claim 1, wherein when it is determined that an action of the driver is inappropriate for driving the vehicle based on the image data, a prompting process for operating a warning device and prompting the driver to be cautious is executed in the vehicle.

11. A method for controlling traveling, the method comprising:

recognizing an action of a driver of a vehicle from image data of the driver;

obtaining information indicating that determination of whether autonomous driving of the vehicle is permissible cannot be given;

operating a human interface and requesting the driver for an instruction to drive the vehicle when the information indicating that determination of whether autonomous driving of the vehicle is permissible cannot be given is obtained;

determining whether the driver is giving an instruction to drive the vehicle from an action of the driver recognized in response to the request for an instruction to drive the vehicle; and permitting autonomous driving of the vehicle by operating a drive system of the vehicle when determined that the driver is giving an instruction to drive the vehicle, wherein the human interface includes a heads-up display, the operating the human interface includes displaying graphics on the heads-up display to indicate an object that is obstructing the determination of whether autonomous driving of the vehicle is permissible, the recognizing an action of the driver includes recognizing a line of sight of the driver, and the determining whether the driver is giving an instruction to drive includes:

storing information indicating that the line of sight is directed toward the graphics when it is detected that the line of sight is directed toward the graphics in during the operating the human interface; and determining that the driver is giving an instruction to drive the vehicle when it is detected that the line of sight is being directed away from the graphics toward a lane in which the vehicle can travel under a condition in which the information indicating that the line of sight is directed toward the graphics is stored.

12. A computer readable storage medium storing a travel control program that has a computer execute the travel permissible information obtaining process, the inquiring process, and the determination process in the travel controller according to claim 1.

* * * * *